(12) United States Patent
Du et al.

(10) Patent No.: US 10,780,348 B2
(45) Date of Patent: Sep. 22, 2020

(54) METHOD AND DEVICE FOR GENERATING CHARACTER BEHAVIORS IN GAME AND STORAGE MEDIUM

(71) Applicant: Tencent Technology (Shenzhen) Company Limited, Shenzhen (CN)

(72) Inventors: Jiachun Du, Shenzhen (CN); Dafu Deng, Shenzhen (CN); Jun Yin, Shenzhen (CN); Xu Cheng, Shenzhen (CN); Le Wan, Shenzhen (CN); Yingjie Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 62 days.

(21) Appl. No.: 16/204,720

(22) Filed: Nov. 29, 2018

(65) Prior Publication Data

US 2019/0184286 A1  Jun. 20, 2019

Related U.S. Application Data

(63) Continuation of application No. PCT/CN2017/104306, filed on Sep. 29, 2017.

(30) Foreign Application Priority Data

Sep. 30, 2016 (CN) .......................... 2016 1 0873452

(51) Int. Cl.
*A63F 9/24* (2006.01)
*A63F 13/57* (2014.01)
(Continued)

(52) U.S. Cl.
CPC .............. *A63F 13/57* (2014.09); *A63F 13/56* (2014.09); *A63F 13/58* (2014.09); *A63F 13/822* (2014.09);
(Continued)

(58) Field of Classification Search
CPC .......... A63F 13/35; A63F 13/56; A63F 13/57; A63F 13/58; A63F 13/67; A63F 13/822;
(Continued)

(56) References Cited

U.S. PATENT DOCUMENTS

| 2001/0039203 A1* | 11/2001 | Brown .................... A63F 13/10 463/16 |
| 2004/0143852 A1* | 7/2004 | Meyers ................... A63F 13/12 725/133 |

(Continued)

FOREIGN PATENT DOCUMENTS

| CN | 104965695 A | 10/2015 |
| CN | 105446742 A | 3/2016 |

(Continued)

*Primary Examiner* — Justin L Myhr
(74) *Attorney, Agent, or Firm* — Brinks Gilson & Lione

(57) ABSTRACT

Embodiments of the present disclosure disclose a method and a device for predicting character behaviors of a non-player character in a game. The method includes receiving status data of a current game sent by a game client, the status data being used to indicate current status of a plurality of characters in the current game; obtaining a behavior order sequence related to the current game from a pre-established behavior order library based on the current status, wherein the behavior order sequence indicates a behavior execution order of the plurality of characters including both player characters and non-player characters; performing simulation on the plurality of characters by using a behavior prediction model in sequence according to the behavior execution order to obtain a simulation result; updating the behavior prediction model according to the simulation result to obtained an updated behavior prediction model; using the updated behavior prediction model to generate behavior information, the behavior information being used to indicate next behaviors of one or more of non-player characters among the plurality of characters; and sending the behavior information (Continued)

to the game client to control the behavior of the one or more non-player characters.

13 Claims, 11 Drawing Sheets

(51) Int. Cl.
    *A63F 13/58*     (2014.01)
    *G06F 17/18*     (2006.01)
    *A63F 13/822*     (2014.01)
    *A63F 13/56*     (2014.01)

(52) U.S. Cl.
    CPC .......... *G06F 17/18* (2013.01); *A63F 2300/60* (2013.01); *A63F 2300/65* (2013.01); *A63F 2300/807* (2013.01)

(58) Field of Classification Search
    CPC .............. A63F 2300/60; A63F 2300/65; A63F 2300/807; G06F 17/18
    See application file for complete search history.

(56) References Cited

U.S. PATENT DOCUMENTS

| | | | |
|---|---|---|---|
| 2005/0071306 A1* | 3/2005 | Kruszewski | A63F 13/10 706/47 |
| 2010/0184515 A1* | 7/2010 | Takahashi | A63F 13/10 463/42 |
| 2010/0279762 A1* | 11/2010 | Sohn | A63F 13/67 463/23 |
| 2010/0317432 A1* | 12/2010 | Tanabe | A63F 13/26 463/30 |
| 2011/0112662 A1 | 5/2011 | Thompson et al. | |
| 2014/0267230 A1* | 9/2014 | Osuna | A63F 13/822 345/419 |
| 2015/0174490 A1* | 6/2015 | Fukuda | A63F 13/5378 463/31 |
| 2016/0166935 A1 | 6/2016 | Condrey et al. | |

FOREIGN PATENT DOCUMENTS

| | | |
|---|---|---|
| CN | 205516493 U | 8/2016 |
| GB | 2444767 A | 6/2008 |

* cited by examiner

METHOD AND DEVICE FOR GENERATING CHARACTER BEHAVIORS IN GAME AND STORAGE MEDIUM

RELATED APPLICATION

This application claims priority to International PCT Application No. PCT/CN2017/104306, entitled "Method and Device for Generating Character Behaviors in Game" and filed with the Chinese Patent Office on Sep. 29, 2017, which claims priority to Chinese Patent Application No. 201610873452.X entitled "Method and Device for Generating Character Behaviors in Game" and filed with the Chinese Patent Office on Sep. 30, 2016, which are incorporated herein by reference in their entireties.

FIELD OF THE TECHNOLOGY

Embodiments of the present disclosure relate to a field of predictive models in computer games, and particularly, to a method and a device for generating character behaviors in a computer game.

BACKGROUND OF THE DISCLOSURE

In current computer games, a game player may interact with or fight against character controlled by artificial intelligence (AI) to experience a game. Therefore, sophistication level of AI character is very important for a game player. Superior AI may simulate human action as much as possible and machine learning is one main method for achieving such AI at present.

Generally speaking, AI is implemented in two stages: an offline training stage and an online implementation or deployment stage. The offline training stage requires a large amount of training data, but log data of actual playing of the game usually cannot supply the required amount of training data. At present, a simulation method is usually used to perform game simulation to generate log data. In order to predict the next strategy or action quickly and accurately, the online implementation stage usually simulates game processes based on current game information so as to perform evaluation and prediction. Currently, game simulation methods mainly include Monte Carlo Tree Search (MCTS) and a behavior tree. For example, in a chess game, MCTS may be used to predict movement in each step, and in a real-time strategic game, a behavior tree may be used to predict and control a next-step action of a non-player character (NPC).

The simulation method only takes two fighting characters into consideration, and performs simulation respectively according to alternative sequential order of moves for the two fighting characters in a game. In some other implementations, it may be assumed that NPCs are independent of one another or are in a simple dependency relationship. Using these implementations, even if all NPCs are simulated at the same time, the simulation method cannot adequately handle a situation where every two characters among a plurality of characters may be dependent in a real-time multi-player game.

FIG. 1 is a flowchart of a method for generating character behaviors in a game according to a related technology. As shown in FIG. 1, the method for generating character behaviors in a game includes: step S101', simulating a strategy or action of party A; step S102': determining whether a game is over, if the game is over, ending the process, and if the game is not over, proceeding to step S103'; step S103': simulating a strategy or action of party B; step S104': determining whether the game is over, if the game is over, ending the process, and if the game is not over, proceeding to step S101'. The method can implement simulation of a chess game, but cannot efficiently and adequately deal with a complicated situation where every two characters may be in a dependence relationship in, e.g., a real-time multi-player game efficiently. Accuracy of generating character behaviors in such a game may be relatively low.

FIG. 2 is a flowchart of another method for generating character behaviors in a game according to a related technology. As shown in FIG. 2, the method for generating character behaviors in the game includes: step S201': simulating strategies and action of all NPCs at the same time; step S202': determining whether the game is over, if the game is over, ending the process, and if the game is not over, proceeding to step S201'. The method can implement simulation of a real-time strategic game, but cannot efficiently and adequately deal with a complicated situation where every two characters may be in a dependence relationship in a real-time multi-player game. Accuracy of generating character behaviors in such a game is relatively low.

Regarding the problem that accuracy of generating character behaviors in a game is relatively low, no efficient solution is provided at present.

SUMMARY

Embodiments of the present disclosure provide a method and a device for predicting and generating character behaviors in a game with improved accuracy and efficiency.

According to one aspect of the embodiments of the present disclosure, a method for generating character behaviors in a game is provided. The method for generating character behaviors in a game includes: receiving status data of a current game sent by a game client, the status data being used to indicate current statuses of a plurality of characters in the current game; starting from the current status, obtaining a behavior order sequence related to the current game from a pre-established behavior order library, the behavior order sequence recording a behavior execution order of the plurality of characters; performing simulation for the plurality of characters by using a behavior prediction model in sequence according to the behavior execution order to obtain a simulation result and an updated behavior prediction model, the updated behavior prediction model being obtained by updating according to the simulation result; using the updated behavior prediction model to generate behavior information, the behavior information being used to indicate a following behavior of one or more of the plurality of characters after the current status; sending the behavior information to the game client.

According to another aspect of the embodiments of the present disclosure, a device for generating character behaviors in a game is provided. The device for generating character behaviors in a game includes: a receiving unit, configured to receive status data of a current game sent by a game client, the status data being used to indicate current statuses of a plurality of characters in the current game; an obtaining unit, configured to start from the current status and obtain a behavior order sequence related to the current game from a pre-established behavior order library, the behavior order sequence recording a behavior execution order of the plurality of characters; a simulation unit, configured to perform simulation on the plurality of characters by using a behavior prediction model in sequence according to the behavior execution order to obtain a simulation result and an updated behavior prediction model, the updated behavior prediction model being obtained by updating according to the simulation result; a generation unit, configured to use the updated behavior prediction model to generate behavior information, the behavior information being used to indicate a following behavior of one or more of the plurality of characters after the current status; a sending unit, configured to send the behavior information to the game client.

According to another aspect of the embodiments of the present disclosure, a terminal is further provided. The terminal is configured to execute program code, the program code being used to perform steps of the method for generating character behaviors in a game according to the embodiments of the present disclosure.

According to another aspect of the embodiments of the present disclosure, a storage medium is further provided. The storage medium is configured to store program code, the program code being used to perform steps of the method of generating character behaviors in a game in the embodiments of the present disclosure.

In the embodiments of the present disclosure, receive status data of a current game sent by a game client, the status data being used to indicate current statuses of a plurality of characters in the current game; start from the current status, obtain a behavior order sequence related to the current game from a pre-established behavior order library, the behavior order sequence recording a behavior execution order of the plurality of characters; perform simulation for the plurality of characters by using a behavior prediction model in sequence according to the behavior execution order to obtain a simulation result and an updated behavior prediction model, the updated behavior prediction model being obtained by updating according to the simulation result; use the updated behavior prediction model to generate behavior information, the behavior information being used to indicate a following behavior of one or more of the plurality of characters after the current status; send the behavior information to the game client, so as to achieve a purpose of generating character behaviors in a game and make simulation be more reasonable, thereby enhancing accuracy of generating character behaviors in a game and generation efficiency, and solving the problem that accuracy of generating character behaviors in a game is relatively low.

BRIEF DESCRIPTION OF THE DRAWINGS

The accompanying drawings are provided to facilitate understanding of the present disclosure. The drawings show below are merely examples of the current disclosure.

DESCRIPTION OF EMBODIMENTS

In order to provide a person of ordinary skill in the art better understanding of the solutions of the present disclosure, the following disclosure describes these technical solutions as various implementations with reference to the accompanying drawings. These implementations are merely examples. Other implementations or embodiments (used interchangeably) that may be derived by a person of ordinary skill in the art based on the embodiments described in the present disclosure without creative efforts shall fall within the protection scope of the present disclosure.

It should be noted that, the terms "the first" and "the second" in the description, claims, and accompanying drawings of the present disclosure are used for distinguishing similar objects or data, rather than for describing a specific order. It should be understood that the embodiments of the present disclosure described herein may be alternatively implemented in an order other than those described in the accompanying drawings or description. Further, terms such as "include", "have". "comprise", and "contain" are intend for covering non-exclusive inclusions. For example, a process, a method, a system, a product or an apparatus including a series of steps or units are not limited to the listed steps or units, and may also include other steps or units that are not explicitly listed or are inherent to the process, method, product, or apparatus.

According to one aspect of the present disclosure, a method for generating character behaviors in a game is provided.

Figure 1:
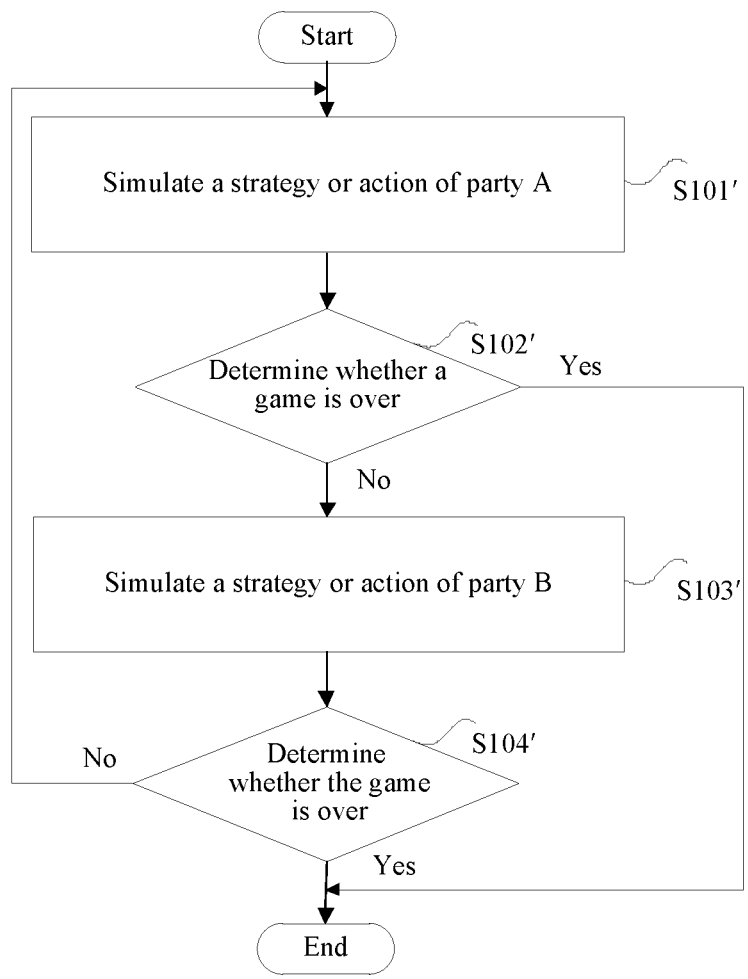
FIG. 1 is a flowchart of a method for generating character behaviors in a game according to a related technology.
Figure 2:
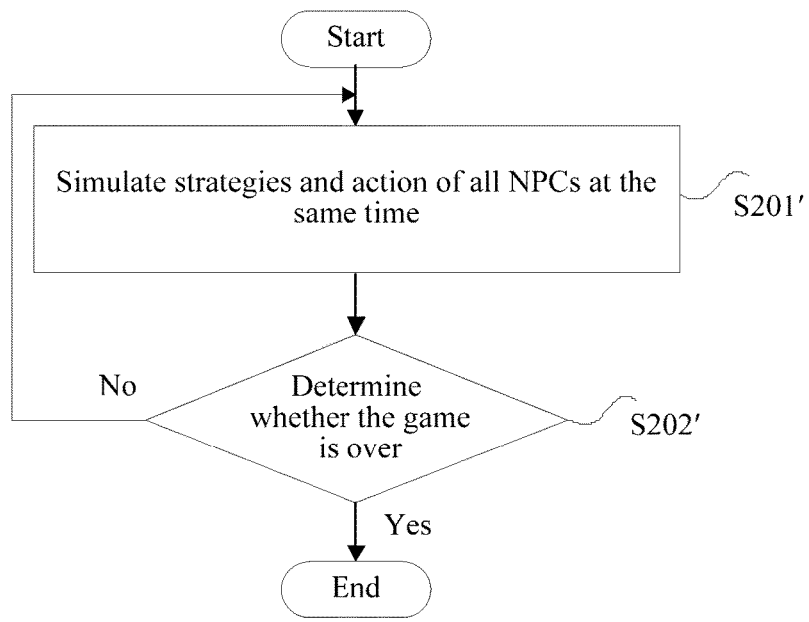
FIG. 2 is a flowchart of another method for generating character behaviors in a game according to a related technology.
Figure 3:
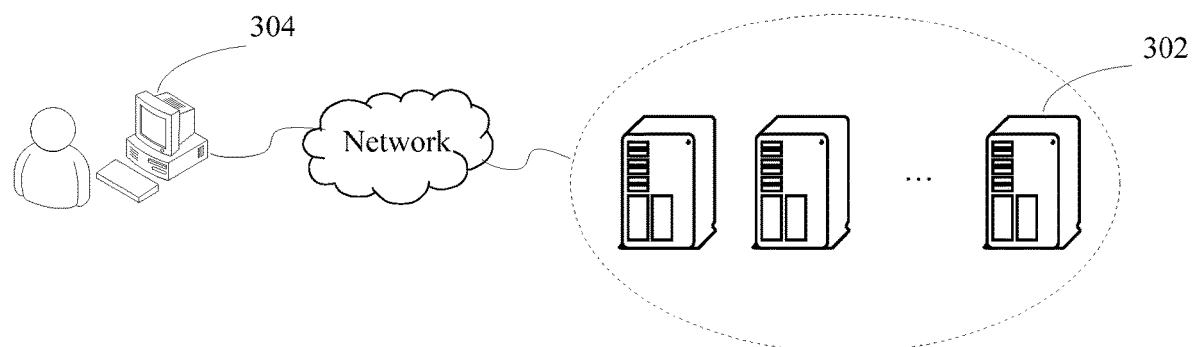
FIG. 3 is a schematic view of a hardware environment of a method for generating character behaviors in a game according to an embodiment of the present disclosure.

In one implementation, the method for generating character behaviors in a game may be implemented in a hardware environment including a server 302 and a terminal 304 as shown in the schematic diagram of FIG. 3. As shown in FIG. 3, the server 302 is in communication with the terminal 304 via a network. The network may include, but is not limited to, a wide area network, a metropolitan area network, or a local area network, and the terminal 304 may include but is not limited to personal computer (PC), a mobile phone, a tablet computer, and so on. The method for generating character behaviors in a game in an embodiment of the present disclosure can be performed by the server 302, the terminal 304, or both. The terminal 304 may also perform the method for generating character behaviors in a game in an embodiment of the present disclosure by a client application installed thereon.

Figure 4:
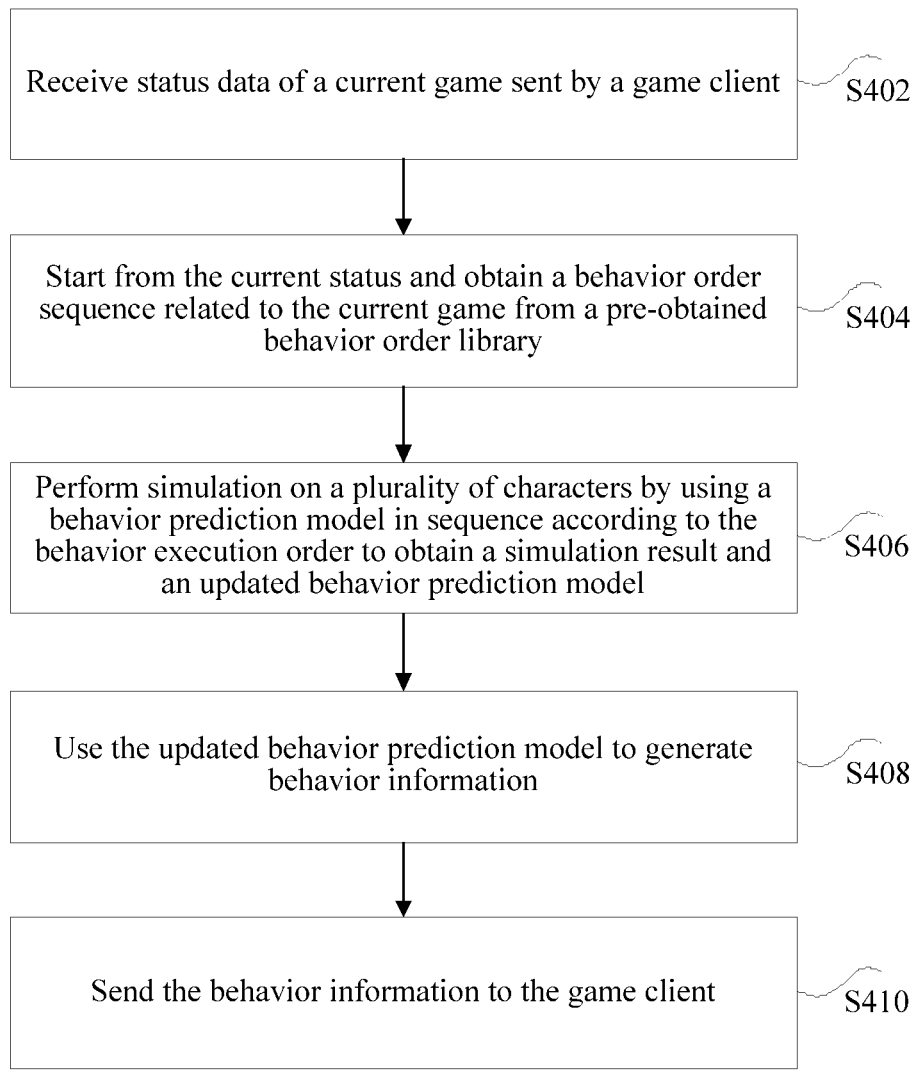
FIG. 4 is a flowchart of a method for generating character behaviors in a game according to an embodiment of the present disclosure.

FIG. 4 is a flowchart of a method for generating character behaviors in a game according to an embodiment of the present disclosure. As shown in FIG. 4, the method for generating character behaviors in a game includes the following steps:

Step S402: Receive status data of a current game sent by a game client.

In the technical solution provided by step S402 in this application, the status data may be used for indicating current statuses of a plurality of characters in the current game.

The game client sends the status data of the current game to a game simulation server via a network, and the game simulation server receives the status data of the current game sent by the client. The current game may include a plurality of characters. The status data of the current game, such as status data of current operation statuses and status data of current action statuses of the plurality of characters, may be sent to the game simulation server, and then, the game simulation server receives the status data of the current game, such as the status data of the current operation statuses and the status data of the current action statuses, sent by the game client.

For example, the current game may include characters A, B, C, and D, a current status of character A may be a waiting status, a current status of character B may be an attacking status, a current status of character C may be a fleeing status, and a current status of character D may be a position status of being located at a specific position or location. Status data for indicating the current statuses of characters A, B, C, and D may be received by the game simulation server.

Step S404: Starting from the current status, obtain a behavior order sequence related to the current game from a pre-established behavior order library.

In the technical solution provided by step S404 in this application, starting from the current status, a behavior order sequence related to the current game from a pre-established behavior order library may be obtained. The behavior order sequence may contain a behavior execution order of the plurality of characters.

The status data of the game is used to indicate statuses of a plurality of characters in the game as a function of action or behavior time. The plurality of characters in the game have different statuses in a game environment as time passes. For example, the status of character A may be a fleeing status at the time of the latest action, the status of character B may be an attacking status at the time of the latest action, the status of character A may be an attacking status at the time of a next following action, and the status of character B may be a fleeing status at the time of a next following action. The status data of the current game is particularly used to indicate the current statuses of the plurality of characters in the current game, including a time of a latest action of each character. After receiving the status data of the current game sent by the game client, the current statuses of the plurality of characters in the current game may be determined, such that the time of the latest action of each character may also be determined.

Starting from the current status, a behavior order sequence related to the current game from a pre-established behavior order library may be obtained. Starting from the current status refers to starting from the time of a latest action of each character without considering the statuses of the plurality of characters at historical action times in the current game. The behavior order sequence related to the current game refers to the behavior order sequence related to the game being played.

Starting from the current status and obtain a behavior order sequence related to the current game from a pre-established behavior order library refers to starting from the time of a latest action of each character and obtaining a behavior order sequence related to this game from a behavior order library. The game time for the server to obtain a behavior order sequence related to this game from the behavior order library starts from the time of latest actions corresponding to the current status. The behavior order library in this embodiment may include a database that is established in advance to store a behavior order sequence. The behavior order sequence refers to an order in which each character takes actions in sequence, and in which the behavior execution orders of a plurality of characters are recorded. For example, one party of the current game has characters A, B, C, and D that form a character combination {A, B, C, D}. The character combination refers to a non-repeatable set of character IDs in the sequence, and characters A, B, C, and D take actions in sequence. When observed from sufficiently small time granularity, behaviors of different characters in a game are actually in an ordered sequence.

In some implementations of a multi-player game, combinations of characters may be diverse. A great amount of accumulated historical game log data is usually recorded at a certain frame rate (for example, 60 frames per second). Generally, at most one character performs an action in a frame, and thus, according to an inter-frame (or frame-to-frame) sequential relationship and the character performing an action corresponding to each frame, a behavior order sequences of various characters may be obtained. After the behavior order sequence of each character is obtained, statistics is collected on a large number of character combinations and behavior order sequences corresponding to the character combinations may be obtained. A behavior order sequence having the highest statistical occurrences for each particular character combination may be obtained for building the behavior order library. Besides obtaining the behavior order sequences, statistics is also collected on parameters such as a behavior frequency and a behavior failure rate for each character.

Starting from the current status, a behavior order sequence related to the current game from a pre-established behavior order library may be obtained. The behavior order sequence related to the current game is obtained as follows:

Step 1: Acquire status data in step S402, the status data including time of a latest action of each character (no matter whether it is controlled by AI, at least this status data is transmitted);

Step 2: Acquire a behavior order sequence corresponding to a same (or matching) character combination of each party. For example, characters in a game may be divided into a plurality of different camps. Each camp is referred to as a party. Each party corresponds to a character combination;

Step 3: Joint the behavior order sequences corresponding to the plurality of parties according to the "behavior frequency" parameter of each character in the behavior order sequence (the parameter needs to be recorded in a statistical stage) and "the time of a latest action" in step 1, so as to form a complete behavior order sequence containing all characters in the game. For example, the game may include two parties, that is, a first party with characters A and B and a second party with characters C and D. The corresponding behavior order sequences may be AB and DC. After the behavior order sequence AB corresponding to the first party and the behavior order sequence DC corresponding to the second party are jointed, the complete behavior order sequence may be formed as ADCB; and Step 4: Perform simulation, and update and prediction of character behaviors based on the complete behavior order sequence.

After the behavior order sequence related to the current game is obtained from the pre-established behavior order library, the behavior order sequence is stored in the form of a queue, and each character in the behavior order sequence is stored. In some implementations, at least IDs of related characters are stored, and the stored parameters may further include time of a last behavior, a behavior frequency, and a behavior failure rate.

Step S406: Perform simulation on a plurality of characters by using a behavior prediction model in sequence according to the behavior execution order to obtain a simulation result and an updated behavior prediction model.

In the technical solution provided by step S406 in this application, simulation on a plurality of characters may be performed using a behavior prediction model in sequence according to a behavior execution order to obtain a simulation result and an updated behavior prediction model. The behavior prediction model may be updated according to the simulation result.

After the behavior order sequence related to the current game is obtained from the pre-established behavior order library, simulation is performed on each character in sequence, that is, simulation is performed on the whole game process. Without losing generality, the simulation may be performed by using a method such as MCTS and/or a behavior tree. An obtained simulation result may be a game result such as an indication of success or failure.

The simulation may be performed by using, for example, a method such as MCTS and/or a behavior tree. MCTS simulation refers to performing simulation on a game many times as specified in advance, updating a behavior prediction model, using a latest behavior prediction model to determine a current strategy that should be used by a character, and simulating behaviors of a current character in sequence. Simulation performed by using a behavior tree may determine a current strategy that should be used by a character according to a complicated rule provided by the behavior tree, so as to simulate a behavior of a current character. The complicated rule is usually artificially defined, for example, when a blood volume (representing energy or livelihood of a character in a game) of a character is lower than a certain threshold, a direction which a character should flee toward and a distance away from a dangerous area are defined. The simulation performed by using a method such as MCTS and a behavior tree reduces computation time and achieves better simulation effects.

In some implementations, for example, an MCTS method starts from a current status to use a behavior prediction model that may be a random prediction model, and performs simulation on a plurality of characters in a determined behavior execution order, and predicts a behavior of each character in sequence and computes the influence of the behavior on a current game; updates the behavior prediction model when simulation is ended, and if the simulation is not ended, continues to perform simulation on an object that requires simulation till the simulation is finished.

After using the behavior prediction model to perform simulation on the plurality of characters in sequence in the behavior execution order, the behavior prediction model is updated according to a simulation result. For example, when the simulation result is determined to be winning, probability that a corresponding prediction result occurs in the prediction model is increased, and when the simulation result is determined to be failing, probability that a corresponding prediction result occurs in the prediction model is decreased, thereby updating the behavior prediction model. The foregoing process is performed repeatedly till the quantity of times of performance set in the MCTS method is reached, thereby realizing simulation of a game process.

In some implementations, a complete simulation process includes simulating character behaviors in sequence. Before determining whether it is necessary to simulate a next character and whether the simulated character needs to be inserted into a queue, whether the current simulation should be terminated needs to be determined. For example, it may be determined whether the game is over or whether the game reaches a certain score. Only when a whole simulation process is terminated, the current simulation result will be obtained and the behavior prediction model is updated according to the game result. However, before the current simulation result is obtained, each time when a character is simulated, whether a condition for terminating the simulation is satisfied needs to be determined.

Step S408: Use the updated behavior prediction model to generate behavior information.

In the technical solution provided by step S408 in this application, the updated behavior prediction model may be used to generate behavior information, the behavior information indicates a following behavior of one or more of the plurality of characters after the current status.

In some implementations, it may be determined whether the quantity (or number) of times of using a behavior prediction model to perform simulation on a plurality of characters in sequence in a behavior execution order reaches a predetermined quantity of times of simulation. For example, starting from the current status, a behavior prediction model (for example, a random prediction model) may be used to predict a behavior of each character in sequence in a selected behavior order sequence. Specifically, each character may be simulated once, the influence of the behavior on the current game may be computed, and whether the quantity of times of simulation reaches a predetermined quantity of times of simulation may be determined. The predetermined quantity of times of simulation may be a parameter that is artificially specified in advance. In some implementations, when MCTS is used for simulation, the predetermined quantity of times of simulation may be the quantity of times of using an MCTS method to finish simulation, and simulation performed by using the MCTS method refers to performing simulation many times (the quantity of times of simulating a game that is specified in advance).

If the quantity of times of using a behavior prediction model to simulate a plurality of characters in sequence in a behavior execution order reaches a predetermined quantity of times of simulation, a latest behavior prediction model is used to predict a following behavior of one or more of current characters after the current status. In particular, a following behavior of one or more of the current characters after the current status is simulated by using a behavior with a maximum probability in the behavior prediction model, and the behavior includes a strategy or action to be performed by a game client.

Step S410: Send the behavior information to the game client.

In the technical solution provided by step S410 in this application, send the behavior information to the game client.

After the updated behavior prediction model is used to generate behavior information, the behavior information is sent to the game client. The client performs the strategy or action in the behavior information. In some implementations, it may be determined whether the game is over, and if the game is determined to be over, the game may be ended. If it is determined that the game is not over yet, step S402 may be performed, and the status data of the current game sent by the game client may be received. Determining whether the game is over refers to determining according to setting of a program of the game. For example, as set in the program of the game, when all opponents are defeated, the territory of the opponents is occupied, or a score has reached a certain value, it may be determined that the game is over.

According to steps S402-S410, status data of a current game sent by a game client may be received, the status data being used to indicate current statuses of a plurality of characters in the current game; starting from the current status, a behavior order sequence related to the current game from a pre-established behavior order library may be obtained, the behavior order sequence recording a behavior execution order of the plurality of characters; simulation on the plurality of characters by using the behavior prediction model in sequence according to the behavior execution order may be performed to obtain a simulation result to and an updated behavior prediction model, the updated behavior prediction model being updated according to the simulation result; the updated behavior prediction model may be used to generate behavior information, the behavior information being used to indicate a following behavior of one or more of the plurality of characters after the current status; and the behavior information may be sent to the game client, so as to achieve technical effects of enhancing/improving accuracy and efficiency of generating character behaviors in a game.

Figure 5:
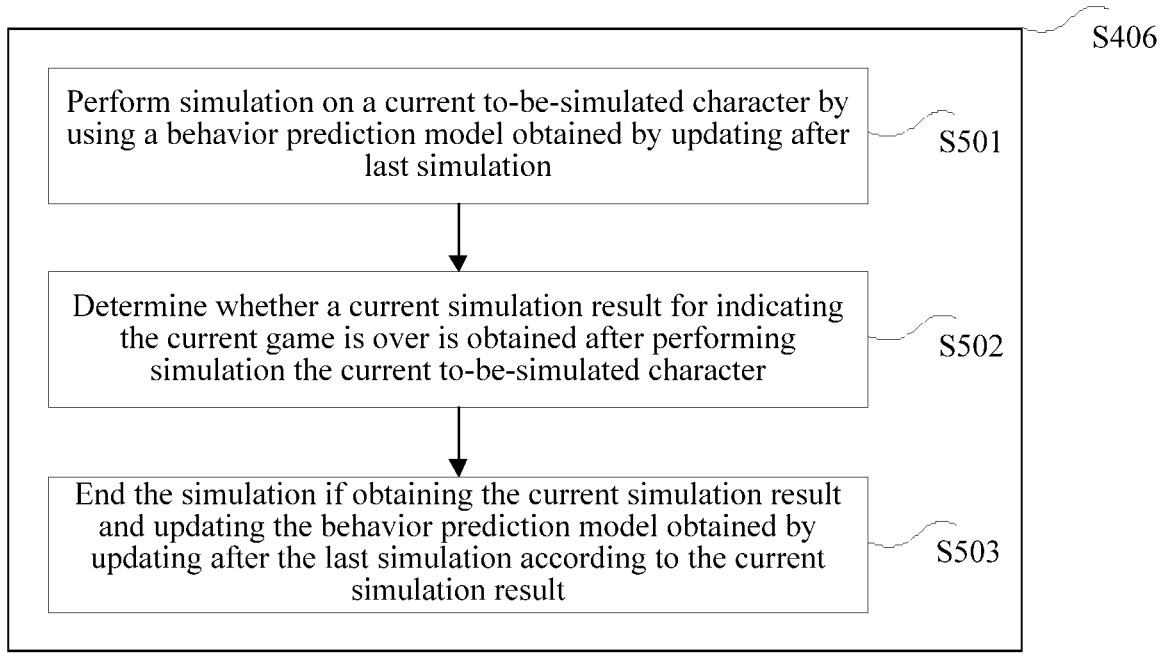
FIG. 5 is a flowchart of a method for performing simulation on a plurality of characters by using a behavior prediction model in sequence in a behavior execution order according to an embodiment of the present disclosure.

In some implementation, step S406 above (perform simulation on the plurality of characters by using the behavior prediction model in sequence according to the behavior execution order to obtain a simulation result and an updated behavior prediction model) may include obtaining a current to-be-simulated character from the plurality of characters in sequence according to the behavior execution order, and performing the steps in FIG. 5 repeatedly till a predetermined quantity of times of simulation is reached.

FIG. 5 is a flowchart of a method for performing simulation on a plurality of characters by using a behavior prediction model in sequence in a behavior execution order according to an embodiment of the present disclosure. As shown in FIG. 5, the method includes the following steps:

Step S501: Perform simulation on a current to-be-simulated character by using a behavior prediction model updated after last simulation.

In the technical solution provided by step S501 in this application, simulation on a current to-be-simulated character by using a behavior prediction model updated after last simulation is performed. Performing simulation on a current to-be-simulated character does not refer to performing simulation on one character, but refers to performing simulation on all current to-be-simulated characters. For example, a method such as MCTS may be used to simulate the strategies or actions of all NPCs at the same time and is not limited herein. The game is performed step by step according to prediction and simulation to finally generate a game result, for example, winning and failing.

Step S502: It is determined whether a current simulation result indicates that the current game is over after performing simulation the current to-be-simulated character.

In the technical solution provided by step S502 in this application, the current simulation result for indicating the current game is over may be a condition that the game is over or reaches a certain score.

Step S503: End the simulation after obtaining the current simulation result, and update the behavior prediction model according to the current simulation result.

In the technical solution provided by step S503 in this application, after step 502, end the simulation after obtaining the current simulation result and update the behavior prediction model according to the current simulation result. The simulation result includes a current simulation result obtained after each simulation. The updated behavior prediction model is obtained by using the current simulation result obtained from the simulation to update the behavior prediction model updated after the second last simulation.

In some implementations, starting from the current status to simulate a game process, the behavior prediction model may be used to predict a behavior of each character in sequence according to the selected behavior order sequence and compute influence of the behavior on the current game. The behavior prediction model may be a random prediction model. Influence of the behavior on the current game may be computed according to the design of the game. It may be determined whether this simulation satisfies a simulation ending condition. If this simulation satisfies a simulation ending condition, update the behavior prediction model updated after the last (previous) simulation according to a current simulation result. For example, when the simulation result is determined to be winning, increase the probability that a corresponding prediction result occurs in the updated behavior prediction model, and when the simulation result is determined to be failing, decrease the probability that a corresponding prediction result occurs in the updated behavior prediction model. If this simulation does not satisfy a simulation ending condition, continue to use the behavior prediction model to predict a behavior of each character in sequence in the selected behavior order sequence and compute the influence of the behavior of each character on the current game.

In some implementations, the simulation ending condition may be simulating till the game is over, or simulating till a pre-specified simulation completion condition is satisfied, for example, determine that simulation is finished when a certain quantity of simulation steps is reached. If the simulation is not finished, the simulation is continued till it is finished.

After updating the behavior prediction model updated after previous simulation according to the current simulation result, it may be determined whether the quantity of times of using a behavior prediction model to perform simulation on a plurality of characters in sequence according to a behavior execution order reaches a predetermined quantity of times of simulation. If the quantity of times of using the behavior prediction model to perform simulation on the plurality of characters in sequence according to the behavior execution order reaches the predetermined quantity of times of simulation, the latest behavior prediction model is used to predict a behavior of a current character, that is, the behavior with a maximum probability in the behavior prediction model is used to simulate the behavior of the current character. The predetermined quantity of times of simulation may be a parameter that is artificially in advance. If the quantity of times of using the behavior prediction model to perform simulation on the plurality of characters in sequence according to the behavior execution order does not reach the predetermined quantity of times of simulation, the behavior prediction model is used in sequence according the behavior execution order to perform simulation on the plurality of characters.

In this embodiment, the following steps are performed repeatedly till the predetermined quantity of times of simulation is reached: obtaining the current to-be-simulated characters from the plurality of character in sequence according to the behavior execution order in this simulation, and performing the following steps repeatedly: performing simulation on the current to-be-simulated character using a behavior prediction model updated after last simulation; determining whether a current simulation result indicates that the current game is over after performing simulation the current to-be-simulated character; ending the simulation after obtaining the current simulation result and updating a behavior prediction model updated after the last simulation according to the current simulation result, so as to achieve the purpose of using the behavior prediction model to simulate the plurality of characters in sequence according to the behavior execution order to obtain a simulation result and an updated behavior prediction model, thereby achieving the technical effects of enhancing accuracy and efficiency of generating character behaviors in the game.

In an alternative implementation, obtaining the current to-be-simulated characters from the plurality of character according to the behavior execution order includes: selecting a current to-be-simulated character located at a head of a queue from an execution queue, the plurality of characters being stored in the execution queue according to the behavior execution orders.

The plurality of characters in the behavior order sequence is stored in the form of the execution queue, and the behavior order sequence records the behavior execution order of the plurality of characters. The current to-be-simulated character located at the head of the queue may be selected from the execution queue, that is, the first object that needs to be simulated is obtained from the execution queue and is simulated.

In an alternative implementation, before performing simulation on the current to-be-simulated characters by using the behavior prediction model updated after the last simulation to obtain the current simulation result, it may be determined whether the simulation is ended. If the simulation is not ended, the current to-be-simulated character on which the simulation is performed may be inserted into the execution queue again, that is, the operation of inserting into the queue is performed before the final simulation result is obtained, and the game result may be obtained only after all characters are simulated many times.

Figure 6:
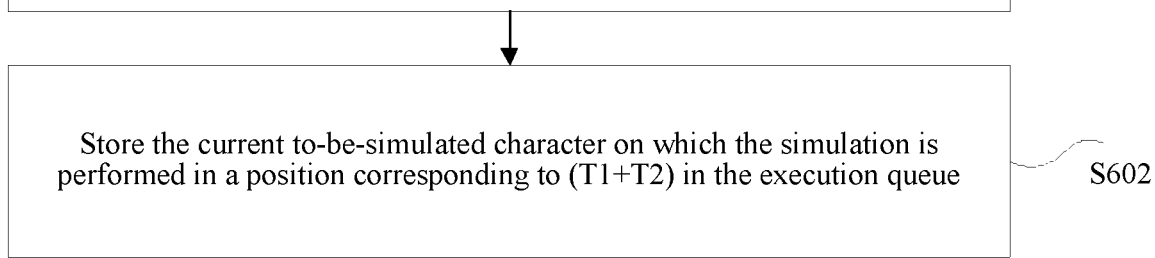
FIG. 6 is a flowchart of another method for performing simulation on the plurality of characters by using a behavior prediction model in sequence in a behavior execution order according to an embodiment of the present disclosure.

FIG. 6 is a flowchart of another method for performing simulation on the plurality of characters by using a behavior prediction model in sequence in a behavior execution order according to an embodiment of the present disclosure. As shown in FIG. 6, the method for performing simulation on the plurality of characters by using a behavior prediction model in sequence according to a behavior execution order includes the following steps:

Step S601: Store, under a condition that a current simulation result for indicating that the current game is over is not obtained, the current to-be-simulated character on which the simulation is performed into an end of the execution queue; or obtain execution time T1 of a last behavior of the current to-be-simulated character in the current status and an interval T2 corresponding to a pre-recorded behavior frequency (inverse of behavior frequency).

In the technical solution provided by step S601 in this application, after performing simulation on the current to-be-simulated characters by using a behavior prediction model updated after the last simulation, and under a condition that a current simulation result for indicating that the current game is over is not obtained, the current to-be-simulated character on which the simulation is performed may be inserted into the execution queue again, by inserting it into the end of the execution queue in sequence according to the behavior execution order in the behavior order sequence, or the time T1 of the last behavior of each character and the behavior interval T2 obtained according to the behavior frequency are obtained, where the behavior frequency corresponds to the last behavior.

Step S602: Store the current to-be-simulated character on which the simulation is performed in a position corresponding to (T1+T2) in the execution queue.

In the technical solution provided by step S602 in this application, the current to-be-simulated character on which the simulation is performed may be stored into the end of the execution queue. Alternatively, after obtaining the execution time T1 of the last behavior of the current to-be-simulated character in the current status and an interval T2 corresponding to a pre-recorded behavior frequency, time T1+T2 of a following behavior may be computed, and the current-to-be-simulated character may be inserted into a corresponding position of the execution queue according to the time T1+T2.

In this embodiment, under a condition that a current simulation result for indicating that the current game is over is not obtained, the current to-be-simulated character on which the simulation is performed may be inserted into an end of the execution queue; or execution time T1 of a last behavior of the current to-be-simulated character in the current status and an interval T2 corresponding to a pre-recorded behavior frequency may be obtained and the current to-be-simulated character on which the simulation is performed may be inserted in a position corresponding to (T1+T2) in the execution queue, thereby achieving the technical effects of enhancing the efficiency and accuracy of generating character behaviors in a game.

In some implementations, before obtaining a behavior order sequence related to the current game from the pre-established behavior order library, statistics on a historical game log may be performed to obtain the behavior order sequence in the behavior order library, where each game log in the historical game log being recorded at a predetermined frame rate, and each frame at the predetermined frame rate contains at most one character that is performing a behavior or action.

Historical game log from a game log database may be read in sequence. Each historical game log may be recorded at the predetermined frame rate, where each frame contain at most one character that is performing an action. The character performing an action in each frame and related data from the historical game log may be extracted in sequence, and arranged in a time order to form a complete game log sequence, start from the first frame. The related data may include data such as a party a character belongs to, the behavior frequency of the character and the behavior failure rate of the character. Then, a complete game log sequence is arranged according to a time order. The complete game log sequence may be decomposed according to each party and a sequence of each party may be generated. Starting from the first character of the sequence of each party, a minimum full sequence of each party in the arrangement in sequence may be determined. The full sequence of each party refers to a certain continuous sub-sequence of the party containing all characters of the party. The continuous sub-sequence refers to that a character string corresponding to the sub-sequence may be contained by a character string corresponding to the character sequence of the party. The sequences are in an inclusion relationship, if a character sequence character string corresponding to a sequence is contained in a character sequence character string corresponding to another sequence, the former is contained in the latter or the former is smaller than the latter.

Each historical game log may generate a complete game log sequence. Each complete game log sequence may provide a plurality of sequences of each party. Each sequence of each party may provide a plurality of all possible minimum full sequences. For the minimum full sequences containing same character combinations, the minimum full sequence of which the quantity of times of occurrence is highest is added to the behavior order library, so as to obtain the behavior order library. The behavior order sequence related to the current game may then be obtained from the pre-established behavior order library.

In some implementations, obtaining a behavior order sequence in a behavior order library by performing statistical operation on a historical game log includes: obtaining the character of each frame having a behavior record from each game log record to obtain a complete game log sequence; obtaining a sub-sequence of each character set from the complete game log sequence; obtaining the minimum full sequence of the character set from the sub-sequence of each character set; and in the minimum full sequences of all game log records of the historical game log, for the minimum full sequences having the same character combination, recording the minimum full sequence of which the quantity of times of occurrence is highest as behavior order sequence in the behavior order library.

Figure 7:
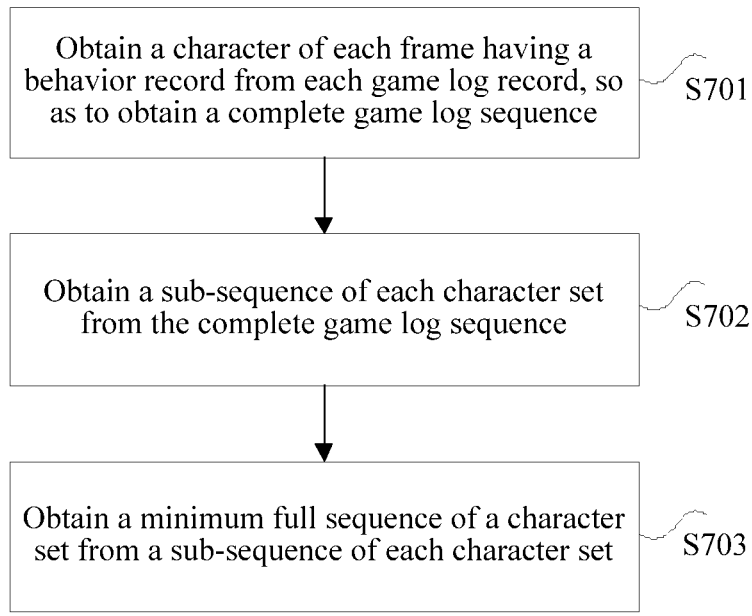
FIG. 7 is a flowchart of a method for obtaining a behavior order sequence in a behavior order library by performing statistical operation on a historical game log according to an embodiment of the present disclosure.

FIG. 7 is a flowchart of a method for obtaining a behavior order sequence in a behavior order library by performing statistical operation on a historical game log according to an embodiment of the present disclosure. As shown in FIG. 7, the method for obtaining a behavior order sequence in a behavior order library by performing statistical operation on a historical game log historical game log includes the following steps:

Step S701: Obtain a character of each frame having a behavior/action record from each game log record, so as to obtain a complete game log sequence.

In the technical solution provided by step S701 in this application, a character of each frame having a behavior record from each game log record is obtained, so as to obtain a complete game log sequence, the complete game log sequence being obtained by arranging characters having a behavior record in all frames in each game log record in a time order.

Characters having a behavior record and related data from each frame of each game log record in sequence are extracted, and arranged into a complete game log sequence in a time order.

Step S702: Obtain a sub-sequence of each character set or combination from the complete game log sequence.

In the technical solution provided by step S702 in this application, a sub-sequence of each character combination from the complete game log sequence is obtained. A plurality of characters is divided into at least two character combinations, and the sub-sequence of each character combination is obtained by arranging characters in all frames having a behavior record and belonging to the character combination in a time order.

Starting from the first frame of the complete game log sequence, the characters having a behavior record and related data from each frame are extracted. The related data includes a party to which a character belong. For example, in a game, characters are divided into different camps or parties and each party is associated with a sub-sequence of a character combination. The related data further includes data such as a behavior frequency and a behavior failure rate of a character. Then, characters in all frames having a behavior record and belonging to the character combination in a time order are arranged.

In one example, it is assumed that the behavior record includes six characters, that is, A, B, C, D, E, and F, and then, the related data of at most one character may be extracted from each frame and may be recorded in the form of a multi-dimensional array, for example, A, B, C, D, E, and F represent corresponding data arrays. It is assumed that twenty frames in the log data contains character behaviors, and the complete game log sequence arranged in a time order is ACBBDEFABCDFEABCDFEC.

The complete game log sequence may then be decomposed according to each character combination to generate a sub-sequence of each character combination. It is assumed that, in this example, the characters A, C, and E belong to one party, the characters B, D, and F belong to another party. As such, the sequence ACBBDEFABCDFEABCDFEC is decomposed into two sub-sequences, that is, ACEACEACEC and BBDFBDFBDF.

Step S703: Obtain a minimum full sequence of a character combination from a sub-sequence of each character combination.

In the technical solution provided by step S703 in this application, a minimum full sequence of a character combination from a sub-sequence of each character combination is obtained. The minimum full sequence includes a continuous character string in a sub-sequence. The continuous character string only includes an identifier of each character in one character set. In the minimum full sequences of all game log records of the historical game log, for the minimum full sequences with the same character combination, the minimum full sequence of which the quantity of times of occurrence is highest is recorded as a behavior order sequence in a behavior order library. Starting from the first character in the sub-sequence of each character set, the minimum full sequences of each party in the arrangement in sequence, and t a minimum full sequence of each character combination may be determined.

A full sequence of each character combination refers to a continuous sub-sequence in the character combination that includes all characters in the character combination. For example, for a sub-sequence ACEACEACEC of a character combination, the continuous character string ACE in the sub-sequence is a full sequence, but AEC (does not appear continuously in the sub-sequence) and AC (does not include all characters in the character combination) are not. The sequences are in an inclusion relationship, if the character sequence character string corresponding to one sequence is included by the character sequence character string corresponding to another sequence, the former is included in the latter, or the former is shorter than the letter. For example, AEC is included in CAECE, or AEC is shorter than CAECE.

The minimum full sequence refers to that the full sequence is a minimum full sequence in the inclusion relationship. The term "in sequence" refers to traversing from the first character of the sequence of a character set to the last character of the sequence of the character set. For example, for ACEACEACEC in a character set, the minimum full sequences are ACE, CEA, and EAC.

For minimum full sequences with the same character combination, the minimum full sequence of which the quantity of times of occurrence is highest is recorded as a behavior order sequence in a behavior order library, and the minimum full sequence of which the quantity of times of occurrence is highest is added to a behavior sequence library. Character combination refers to a set of characters with non-repeated IDs in the sequence, for example, the character combination of CAECE is a set {C, A, E}.

The implementation above includes the step of: obtain the characters of each frame having a behavior record from each game log record to obtain a complete game log sequence, the complete game log sequence being obtained by arranging characters in all frames having a behavior record in each game log record in a time order; obtain a sub-sequence of each character combination from the complete game log sequence, a plurality of characters being divided into at least two character combinations, a sub-sequence of a character set being obtained by arranging characters in all frames having a behavior record and belonging to the character combination in a time order; obtain a minimum full sequence of each character set from the sub-sequence of each character set, the minimum full sequence includes a continuous character string in a sub-sequence, the continuous character string only including an identifier of each character in a character set; in the minimum full sequences of all game log records of the historical game log, for the minimum full sequences with the same character combination, record the minimum full sequence of which the quantity of times of occurrence is the highest as a behavior order sequence in a behavior order library, so as to achieve the purpose of obtaining a behavior order sequence in a behavior order library by performing statistical operation on a historical game log, thereby achieving the technical effects of enhancing efficiency and accuracy of generating character behaviors in a game.

In some implementations, a current game includes a real-time strategic game, in which a plurality of characters is divided into at least two character combinations that are of opposite positions.

When a current game is a real-time strategic game, the current game is performed in real-time, rather than being a round system that is common in a policy game. A plurality of characters may be divided into at least two character combinations that are opposite in a real-time strategic game, so that simulation of a plurality of characters in a real-time multi-player game becomes feasible.

In the embodiments of the present disclosure, simulation of a plurality of characters in a real-time multi-player game becomes feasible by using a behavior order sequence, such a manner fits the features of a real-time multi-player game, and is less computation intensive. Furthermore, with reference to a simulation method such as MCTS and a behavior tree, not only AI may be comparable to or even surpass the level of human players and AI ability may be enhanced, but also the whole simulation process may satisfy strict real-time requirements of a multi-player game, thereby achieving the technical effects of enhancing efficiency and accuracy of generating character behaviors in a game and enhancing experience of game players.

The technical solutions of the present disclosure are described with reference to another implementation below.

This implementation provides an order-based simulation method in a real-time multi-player game, which may perform more reasonable simulation on a complicated condition such as a real-time multi-player game, enhance AI ability, and satisfy strict real-time requirements of a multi-player game.

Figure 8:
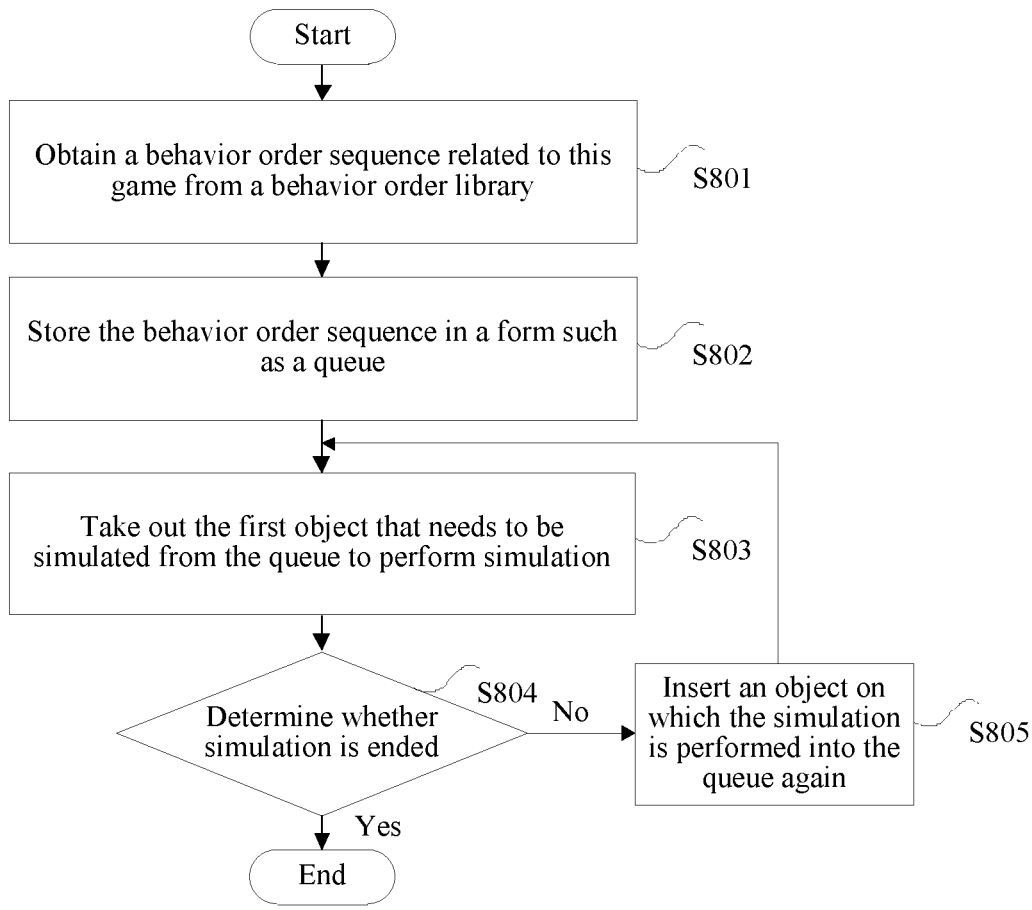
FIG. 8 is a flowchart of another method for generating character behaviors in a game according to an embodiment of the present disclosure.

FIG. 8 is a flowchart of this method for generating character behaviors in a game according to an embodiment of the present disclosure. As shown in FIG. 8, the method for generating character behaviors in a game includes the following steps:

Step S801: Obtain a behavior order sequence related to this game from a behavior order library.

In particular, a behavior order sequence in a behavior order sequence database may be obtained by a method such as performing statistical operation on historical game logs.

The behavior sequence library is a database for storing behavior order data. A behavior order means an order in which each character takes action in sequence. When observed from extremely small time granularity, the behaviors of different characters in a game are actually in an order. In a multi-player game, a combination of characters is diverse, and a behavior order of each character in different character combinations may be obtained according to a statistics-based method.

In some implementations, a great amount of accumulated game log data is usually recorded at a certain frame rate (for example, 60 frames per second), and generally at most one character takes action in every frame, and thus, according to an inter-frame sequential relationship and the character of an action corresponding to each frame, a behavior order sequences of different characters may be obtained, then, statistics is collected on a large number of character combinations and on the behavior order sequences corresponding to the character combinations. A behavior order sequence of which the quantity of times of occurrence is highest is remained for the same character combination, so as to obtain a behavior sequence library. Besides obtaining the behavior order sequence, statistics is also performed on parameters such as behavior frequency and behavior failure rate of each character, so as to achieve a behavior order sequence related to this game from the behavior order library.

The behavior order sequence related to this game is obtained as follows.

Step 1: Acquire status data, the status data including time of a latest action of each character (no matter whether it is controlled by AI) (at least this status data is transmitted);

Step 2: Acquire a behavior order sequence that corresponding to a same (or matching) a character combination of each party;

Step 3: Joint behavior order sequences corresponding to a plurality of parties according to a "behavior frequency" parameter of each character in the behavior order sequence (the parameter needs to be recorded in the statistical stage) and "time of latest actions" in step 1, so as to form a complete behavior order sequence containing all characters in the game.

Step 4: Perform simulation, updating, and prediction of character behaviors based on the complete behavior order sequence.

Step S802: Store the behavior order sequence in a form such as a queue.

The behavior order sequence is stored in the form of a queue, and the queue is an execution queue. For each object (that is, character) in the behavior order sequence, at least IDs of related characters need to be stored. In addition, parameters to be stored further include: time of a last action, a behavior frequency, and a behavior failure rate.

Step S803: Select the first object that needs to be simulated from the queue to perform simulation.

In particular, the simulation may be performed by using a method such as MCTS and a behavior tree.

Step S804: Determine whether simulation is ended.

If it is determined that the simulation is ended, ending the simulation, If it is determined that the simulation is not ended, performing step S805. Determining whether the simulation is ended refers to determining according to the setting of a program of the game, for example, all opponents are defeated, the territory of the opponents is occupied, or a score has reached a certain value.

Step S805: Insert an object (character) on which the simulation is performed into the queue again.

If it is determined that the simulation is not ended, insert an object on which the simulation is performed into the queue again, and then perform step S803.

For example, the object may be inserted into the end of the queue according to an order in the behavior order sequence, or according to time T1 of a last behavior of each character and a behavior interval T2 obtained according to the behavior frequency. In particular, T1+T2 may be computed, and the object may be inserted into a corresponding position of the queue according to the time T1+T2.

Thus, the implementation above includes: select a behavior order sequence related to this game from a behavior order library, store the behavior order sequence in a form such as a queue, select the first object that needs to be simulated from the queue to perform simulation, determine whether the game is over, if it is determined that the game is over, end the game, if it is determined that the game is not over, insert the object on which the simulation is performed into the queue again, so as to achieve the purpose of performing simulation in an order sequence. Such a manner fits the features of a real-time multi-player game, and is less computation intensive. Furthermore, with reference to a simulation method that is the mainstream in the industry, not only AI may be comparable to or even surpass the level of human players and AI ability may be enhanced, but also the whole simulation process may better satisfy strict real-time requirements of a multi-player game.

Figure 9:
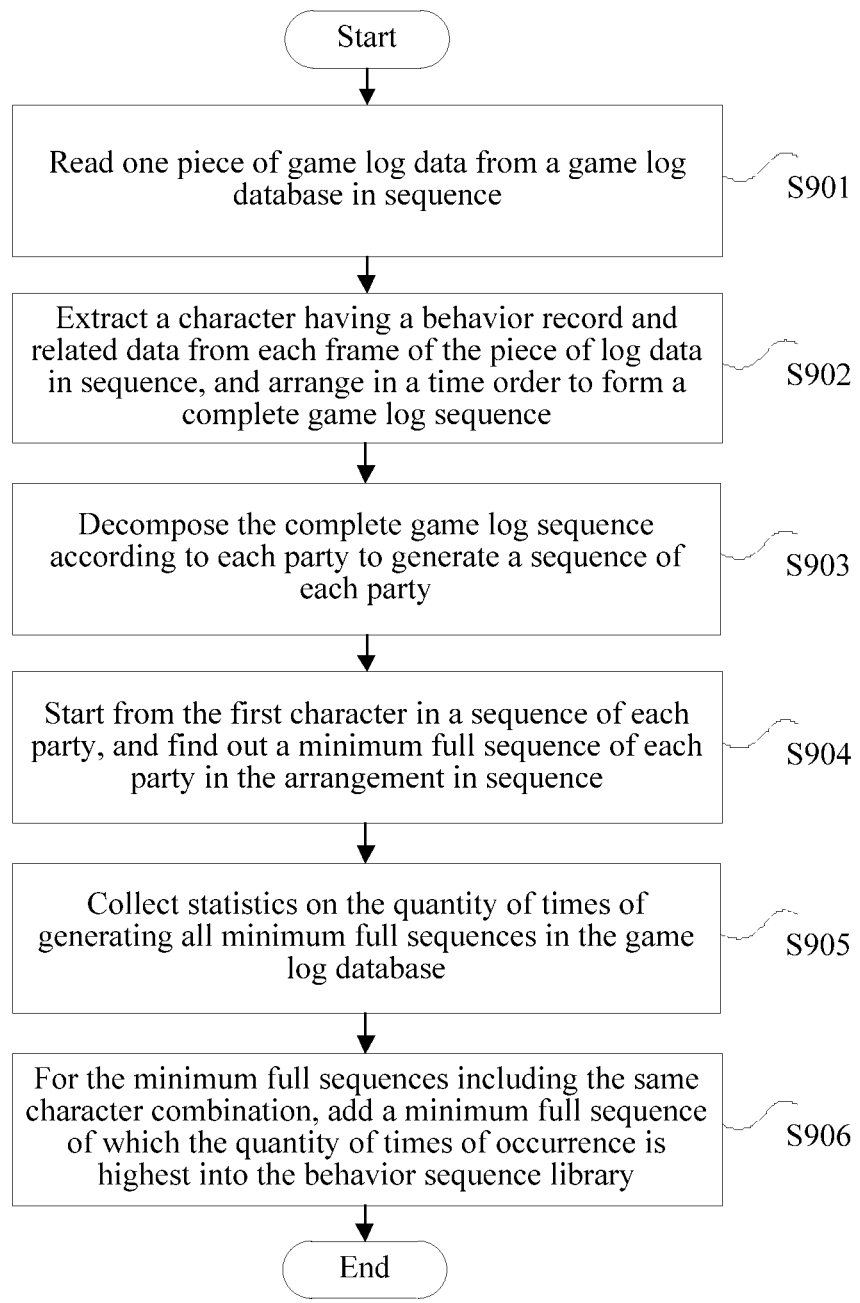
FIG. 9 is a flowchart of a statistics-based method for obtaining a behavior sequence library according to an embodiment of the present disclosure.

FIG. 9 is a flowchart of a statistics-based method for obtaining a behavior sequence library according to an embodiment of the present disclosure. As shown in FIG. 9, the statistics-based method for obtaining a behavior sequence library includes the following steps:

Step S901: Read each piece of game log data from a game log database in sequence.

Each piece of game log data is recorded at a given frame rate, and each frame at most has one character that is taking action.

Step S902: Extract a character having a behavior record and related data from each frame of the piece of log data in sequence, and arrange in a time order to form a complete game log sequence.

Step S902 may include: start from the first frame, and extract a character having a behavior record and related data in each frame. The related data may include data such as a party a character belongs to, a behavior frequency of a character and a behavior failure rate of a character. Then, arrange in a time order. In one example, it is assumed that this game record includes six characters, that is, A, B, C, D, E, and F, and then, the related data of at most one character may be extracted from each frame and may be recorded in the form of a multi-dimensional array, for example, A, B, C, D, E, and F represent corresponding data arrays. It is assumed that twenty frames in the piece of log data record character behaviors, and the complete game log sequence arranged in a time order is similar to a form of ACBBDEFABCDFEABCDFEC.

Step S903: Decompose the complete game log sequence according to each party to generate a sequence of each party.

It is assumed that, in the example, the characters A, C, and E belong to one party, the characters B, D, and F belong to another party, and then, the sequence ACBBDEFABCDFE-ABCDFEC may be decomposed into two sequences, that is, ACEACEACEC and BBDFBDFBDF.

Step S904: Start from the first character in a sequence of each party, and find out a minimum full sequence of each party in the arrangement in sequence.

A full sequence of each party refers to a certain continuous sub-sequence of this party containing all characters of this party, the continuous sub-sequence refers to that a character sequence (only character IDs are remained in the sequence) character string corresponding to the sub-sequence may be included by a character string corresponding to the sequence of this party. For example, for a sequence ACEACEACEC, ACE is a full sequence, but AEC and AC are not. The sequences are in an inclusion relationship, if the character sequence character string corresponding to one sequence is included by the character sequence character string corresponding to another sequence, the former is included in the latter, or the former is shorter than the letter. For example, AEC is included in CAECE, or AEC is shorter than CAECE. The minimum refers to that the full sequence is a minimum full sequence in the inclusion relationship. The term "in sequence" refers to traversing from the first character of a sequence of each party to the last character of the sequence of the party. For example, for ACEACEACEC, the minimum full sequences are: ACE, CEA, and EAC.

Step S905: Collect statistics on the quantity of times of generating all minimum full sequences in the game log database.

Each game log generates a complete game log sequence, each complete game log sequence generates a plurality of sequences of each party, and each sequence of each party generates a plurality of minimum full sequences.

Step S906: For the minimum full sequences including the same character combination, add a minimum full sequence of which the quantity of times of occurrence is highest into the behavior sequence library.

For the minimum full sequences including the same character combination, add a minimum full sequence of which the quantity of times of occurrence is highest into the behavior sequence library. Character combination refers to a set of characters with non-repeated IDs in the sequence, for example, the character combination of CAECE is a set {C, A, E}.

The behavior order sequence related to this game in this embodiment refers to a behavior order sequence in which the character combination in the behavior order sequence database is the same as the character combination of each part controlled by AI in this game.

At the same time of playing the game, a behavior order sequence, a behavior frequency, and a behavior failure rate of an opponent may be analyzed in real time, the behavior order sequence and other parameters of AI are adjusted, so that AI ability is closer to the opponent and will not be stronger or weaker than the opponent.

Figure 10:
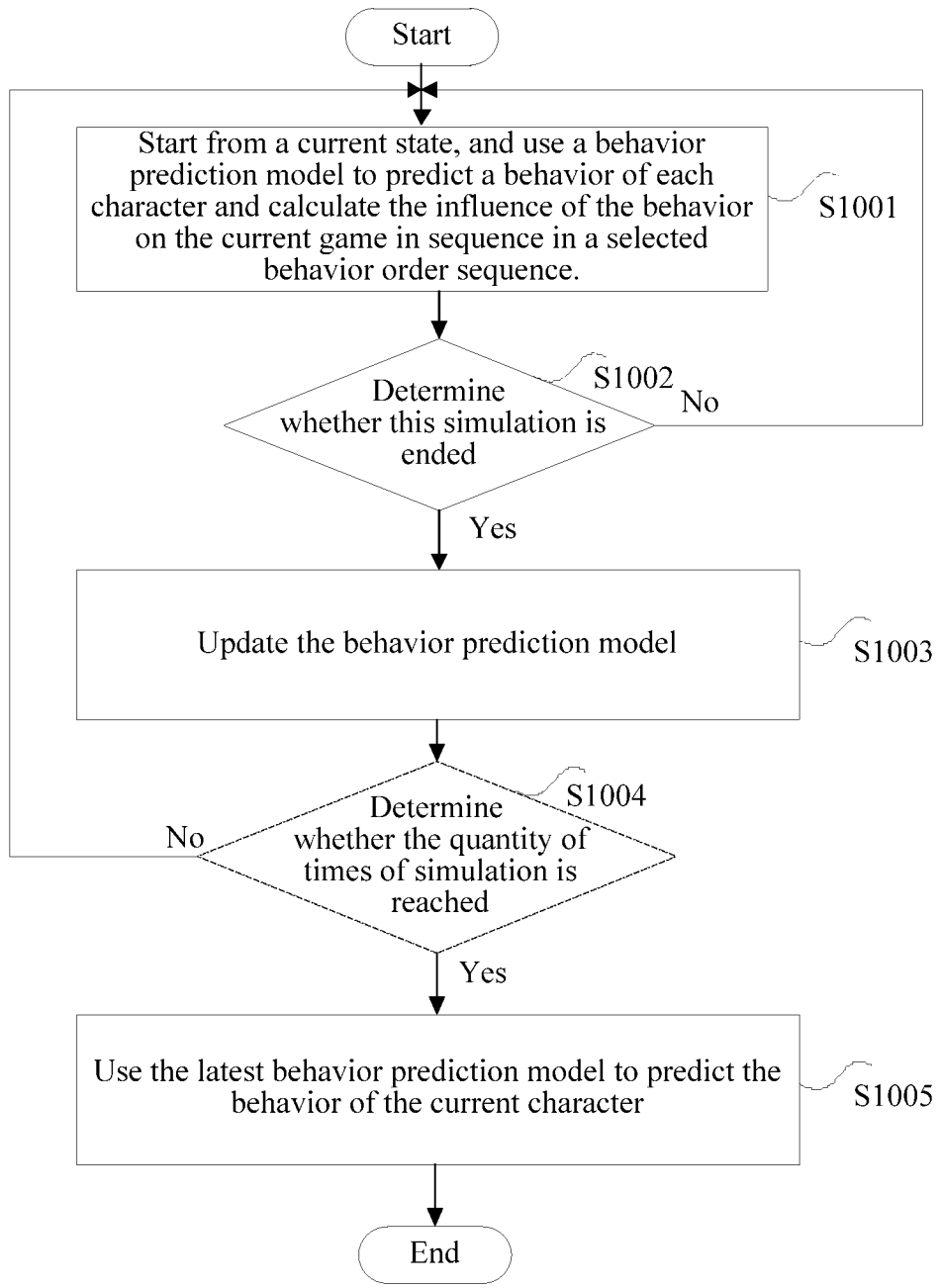
FIG. 10 is a flowchart of a method for performing simulation using MCTS according to an embodiment of the present disclosure.

FIG. 10 is a flowchart of a method for performing simulation through MCTS according to an embodiment of the present disclosure. As shown in FIG. 10, the method for performing simulation through MCTS includes the following steps:

Step S1001: Start from a current state, and use a behavior prediction model to predict a behavior of each character and calculate the influence of the behavior on the current game in sequence in a selected behavior order sequence.

In particular, the behavior prediction model may be a random prediction model.

Using MCTS simulation refers to performing simulation many times (a specified quantity of times of game simulation). Calculate the influence of the behavior on the current game according to the design of the game.

Step S1002: Determine whether this simulation is ended.

Determine whether this simulation is ended. It is determined that the simulation is ended, perform step S1003, and if it is determined that the simulation is not ended, perform step S1001.

The simulation ending condition may be performing simulation till the game is over or the simulation satisfying a simulation completion condition that is specified in advance. For example, reach a certain quantity of simulation steps. If the simulation is not completed, continue simulation till the simulation is completed.

Step S1003: Update the behavior prediction model.

At the end of each simulation, the behavior prediction model is updated according to a simulation result. For example, when the simulation result is determined to be successful, the probability of the occurrence of a corresponding prediction result in a prediction model is increased, and when the simulation result is determined to be failing, the probability of the occurrence of a corresponding prediction result in a prediction model is decreased, thereby implementing updating on the prediction behavior model.

Step S1004: Determine whether the quantity of times of simulation is reached.

After the behavior prediction model is updated, determine whether the quantity of times of simulation is reached. If it is determined that the quantity of times of simulation is reached, perform step S1005, and if it is determined the quantity of times of simulation is not reached, perform step S1001.

The quantity of times of simulation is a parameter that is specified artificially in advance. If the requirement for the quantity of times of simulation is not reached, simulation needs to be continued.

Step S1005: Use the latest behavior prediction model to predict the behavior of the current character.

The behavior having the maximum probability in the behavior prediction model is used to simulate the behavior of the current character.

The method for generating character behaviors in a game in this embodiment of the present disclosure may simulate a real-time multi-player game accurately and efficiently, so that not only AI may become comparable to or even surpass the level of human players and AI ability may be enhanced, but also the whole simulation process may satisfy strict real-time requirements of a real-time multi-player game, thereby enhancing accuracy and efficiency of generating character behaviors in a game and enhancing user experience of game players.

It should be noted that, the embodiments of each of the foregoing methods are described as a combination of a series of actions for simplification. However, a person of ordinary skill in the art should understand that the present disclosure is not limited by the order of action described. Therefore, according to the present disclosure, some steps may be performed in another order or at the same time. Secondly, a person of ordinary skill in the art should also know that the embodiments described in the specification are preferred embodiments and the action and modules are not necessary to the present disclosure.

According to the description of the embodiments, a person of ordinary skill in the art could understand that the methods in the embodiments may be implemented by software and necessary general hardware platforms, and certainly may also be implemented by hardware, but in most conditions, the former is a preferred embodiment. Based on such understanding, the technical solution in the present disclosure essential may be embodied in the form of a software product, the computer software product is stored in a storage medium (such as ROM/RAM, a magnetic disc, and an optical disc) and includes several instructions for enabling a terminal device (that may be a mobile phone, a computer, a server or a network device) to perform the method in each embodiment of the present disclosure.

Figure 11:
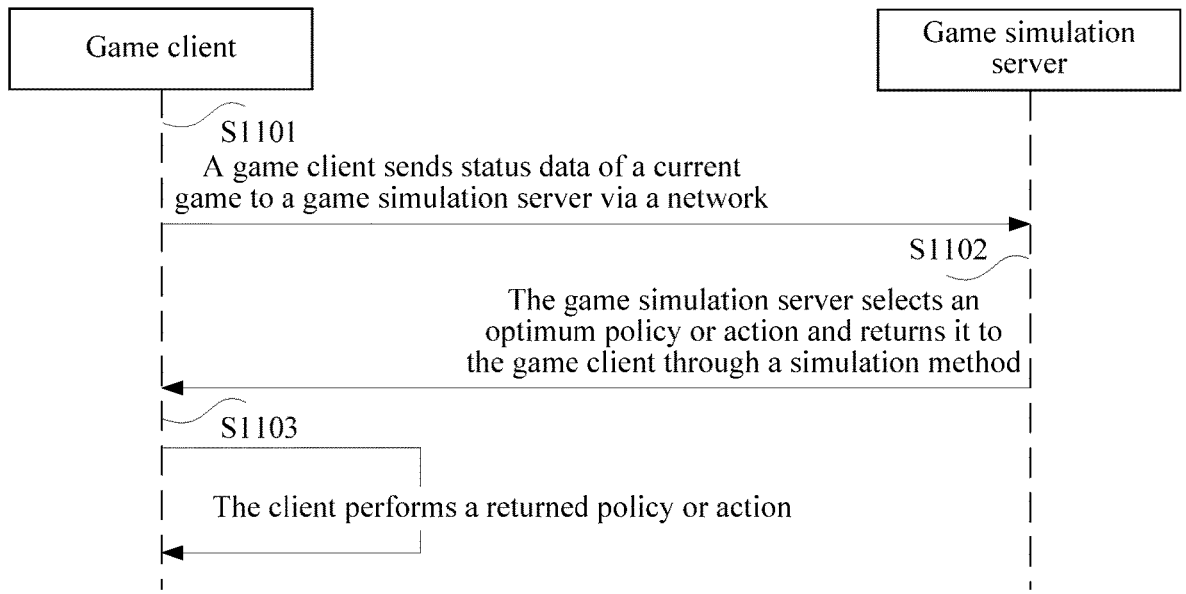
FIG. 11 is a schematic flowchart of a method for interaction in a game according to an embodiment of the present disclosure.

The order-based simulation method according to the embodiments of the present disclosure can simulate a complicated situation such as a real-time multi-player game more reasonably, enhance AI capability, and satisfy strict real-time requirements of a real-time multi-player game Another implementation is shown in FIG. 11, The application environment of the this implementation may include, but is not limited to, an application environment with reference to the foregoing embodiment and will not be described repeatedly in this embodiment. The embodiments of the present disclosure provide an optional specific application for implementing the method for generating character behaviors in a game.

In particular, FIG. 11 is a schematic flowchart of a method for interaction in a game according to an embodiment of the present disclosure. As shown in FIG. 11, the interaction method in the game includes the following steps:

Step S1101: A game client sends status data of a current game to a game simulation server via a network.

Step S1102: The game simulation server selects an optimum policy or action and returns it to the game client through a simulation method.

Step S1103: The client performs a returned policy or action.

In this embodiment, the game client uploads the status data to the game simulation server in real time. The status data includes the status data of a current operation status, or action status data of a current action. The game simulation server obtains a character combination and a behavior order sequence that is the same as a character combination of each party in this game from the behavior order library according to the current status data and the prediction behavior model, performs simulation on a plurality of characters by using the behavior prediction model in sequence according to the behavior execution order, so as to obtain a simulation result and an updated behavior prediction model, the simulation result may be a failing or successful simulation result, the updated behavior prediction model is used to generate behavior information, the behavior information is an optimum policy or action obtained through predicting one or more characters by using the behavior prediction model, that is, the policy or action that is performed by the game client has highest probability. The behavior information is sent to the game client, and the client performs the policy or action returned by the game simulation server.

The order-based simulation method in a real-time multi-player game according to the embodiments of the present disclosure can simulate a real-time multi-player game more accurately and efficiently, so that not only AI may become comparable to or even surpass the level of human players and AI ability may be enhanced, but also the whole simulation process may satisfy strict real-time requirements of a real-time multi-player game, thereby enhancing experience of game players better.

Figure 12:
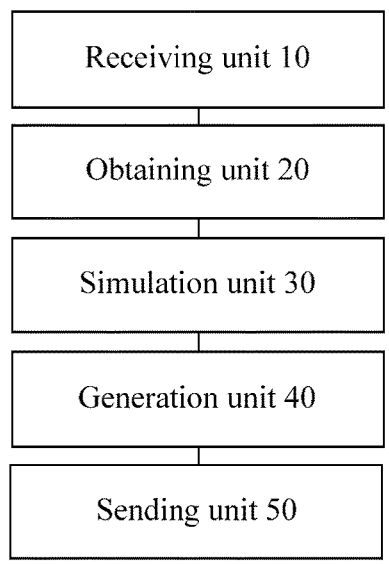
FIG. 12 is a schematic view of a device for generating character behaviors in a game according to an embodiment of the present disclosure.

According to another aspect of the embodiment of the present disclosure, a device for generating character behaviors in a game that is used for implementing the method for generating character behaviors in a game is further provided. FIG. 12 is a schematic view of a device for generating character behaviors in a game according to an embodiment of the present disclosure. As shown in FIG. 12, the device for generating character behaviors in a game includes a receiving unit 10, an obtaining unit 20, a simulation unit 30, a generation unit 40, and a sending unit 50.

The receiving unit 10 is configured to receive status data of a current game sent by a game client, the status data being used to indicate current statuses of a plurality of characters in the current game.

The obtaining unit 20 is configured to start from the current status and obtain a behavior order sequence related to the current game from a pre-established behavior order library, the behavior order sequence recording a behavior execution order of the plurality of characters.

The simulation unit 30 is configured to perform simulation on the plurality of characters by using a behavior prediction model in sequence according to the behavior execution order to obtain a simulation result and an updated behavior prediction model, the updated behavior prediction model being obtained by updating according to the simulation result.

The generation unit 40 is configured to use the updated behavior prediction model to generate behavior information, the behavior information being used to indicate a following behavior of one or more of the plurality of characters after the current status.

The sending unit 50 is configured to send the behavior information to the game client.

It should be noted that, the receiving unit 10, the obtaining unit 20, the simulation unit 30, the generation unit 40, and the sending unit 50 may operate in a terminal as a part of the device, and the functions implemented by the units may be performed through a processor in the terminal. The terminal may also be a terminal device such as an intelligent phone (such as an Android phone and an iOS phone), a tablet computer, a palm computer, a Mobile Internet Device (MID), and a PAD.

Figure 13:
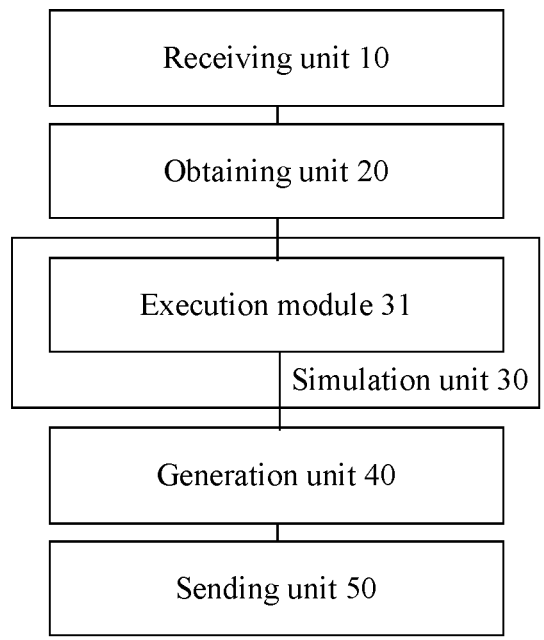
FIG. 13 is a schematic view of another device for generating character behaviors in a game according to an embodiment of the present disclosure.

FIG. 13 is a schematic view of another device for generating character behaviors in a game according to an embodiment of the present disclosure. As shown in FIG. 13, the device for generating character behaviors in a game includes a receiving unit 10, an obtaining unit 20, a simulation unit 30, a generation unit 40, and a sending unit 50. The simulation unit 30 includes an execution module 31.

It should be noted that, the receiving unit 10, the obtaining unit 20, the simulation unit 30, the generation unit 40, and the sending unit 50 in this embodiment have the same functions as those in the device for generating character behaviors in a game in the embodiment shown in FIG. 12, and will not be described repeatedly herein.

The execution module 31 is configured to obtain a current to-be-simulated character from the plurality of characters in sequence according to the behavior execution order in the simulation, and perform following steps: performing simulation on the current to-be-simulated character by using a behavior prediction model obtained by updating after last simulation; determining whether a current simulation result for indicating that the current game is over is obtained after performing simulation on the current to-be-simulated character; ending the simulation if obtaining the current simulation result and updating a behavior prediction model obtained by updating after the last simulation according to the current simulation result.

It should be noted that, the execution module 31 may operate in a terminal as a part of the device, and the functions implemented by the module may be performed by a processor in the terminal. The terminal may also be a terminal device such as an intelligent phone (such as an Android phone and an iOS phone), a tablet computer, a palm computer, a Mobile Internet Device (MID), and a PAD.

Optionally, the simulation result includes the current simulation result obtained by each simulation, and the updated behavior prediction model is obtained by using the current simulation result obtained by last simulation to update a behavior prediction model obtained by updating after last but one simulation.

Optionally, the simulation unit 30 is configured to take out the current to-be-simulated character located at a head of an execution queue from the execution queue, and the plurality of characters is stored into the execution queue according to the behavior execution order.

Optionally, the execution module 31 is further configured to, in a situation that a current simulation result for indicating that the current game is over is not obtained, store the current to-be-simulated character on which the simulation is performed into an end of the execution queue; or obtain execution time T1 of a last behavior of the current to-be-simulated character in the current status and an interval T2 corresponding to a pre-recorded behavior frequency, and store the current to-be-simulated character on which the simulation is performed in a position corresponding to (T1+T2) in the execution queue, where the behavior frequency is corresponding to the last behavior.

Figure 14:
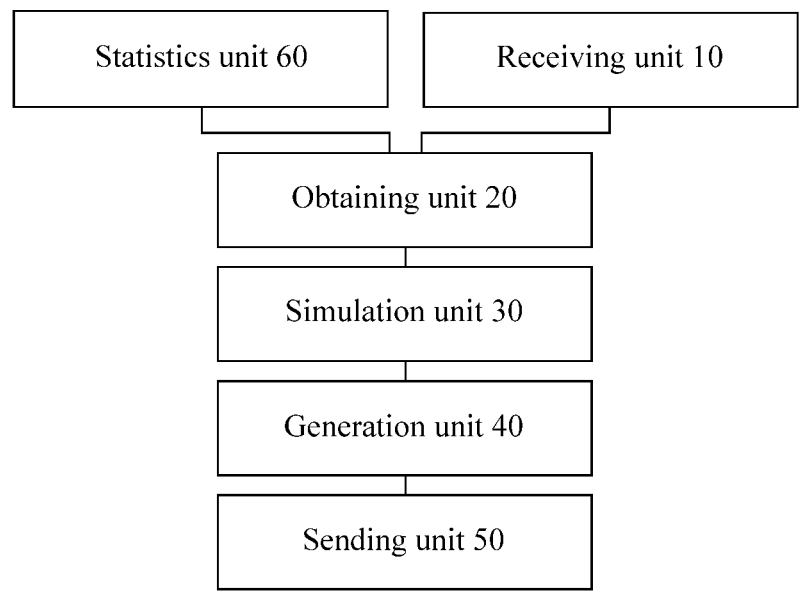
FIG. 14 is a schematic view of another device for generating character behaviors in a game according to an embodiment of the present disclosure.

FIG. 14 is a schematic view of another device for generating character behaviors in a game according to an embodiment of the present disclosure. As shown in FIG. 14, the device for generating character behaviors in a game includes a receiving unit 10, an obtaining unit 20, a simulation unit 30, a generation unit 40, and a sending unit 50. The device for generating character behaviors in a game further includes a statistics unit 60.

It should be noted that, the receiving unit 10, the obtaining unit 20, the simulation unit 30, the generation unit 40, and the sending unit 50 in this embodiment have the same functions as those in the device for generating character behaviors in a game in the embodiment shown in FIG. 12, and will not be described repeatedly herein.

The statistics unit 60 is configured to, before obtaining a behavior order sequence related to the current game from a pre-established behavior order library, perform a statistical operation on a historical game log to obtain a behavior order sequence in the behavior order library, where each game log record in the historical game log is recorded at a predetermined frame rate, and each frame at the predetermined frame rate has at most one character that is performing a behavior.

It should be noted that, the statistics unit 60 may operate in a terminal as a part of the device, and the functions implemented by the units may be performed by a processor in the terminal. The terminal may also be a terminal device such as an intelligent phone (such as an Android phone and an iOS phone), a tablet computer, a palm computer, a Mobile Internet Device (MID), and a PAD.

Figure 15:
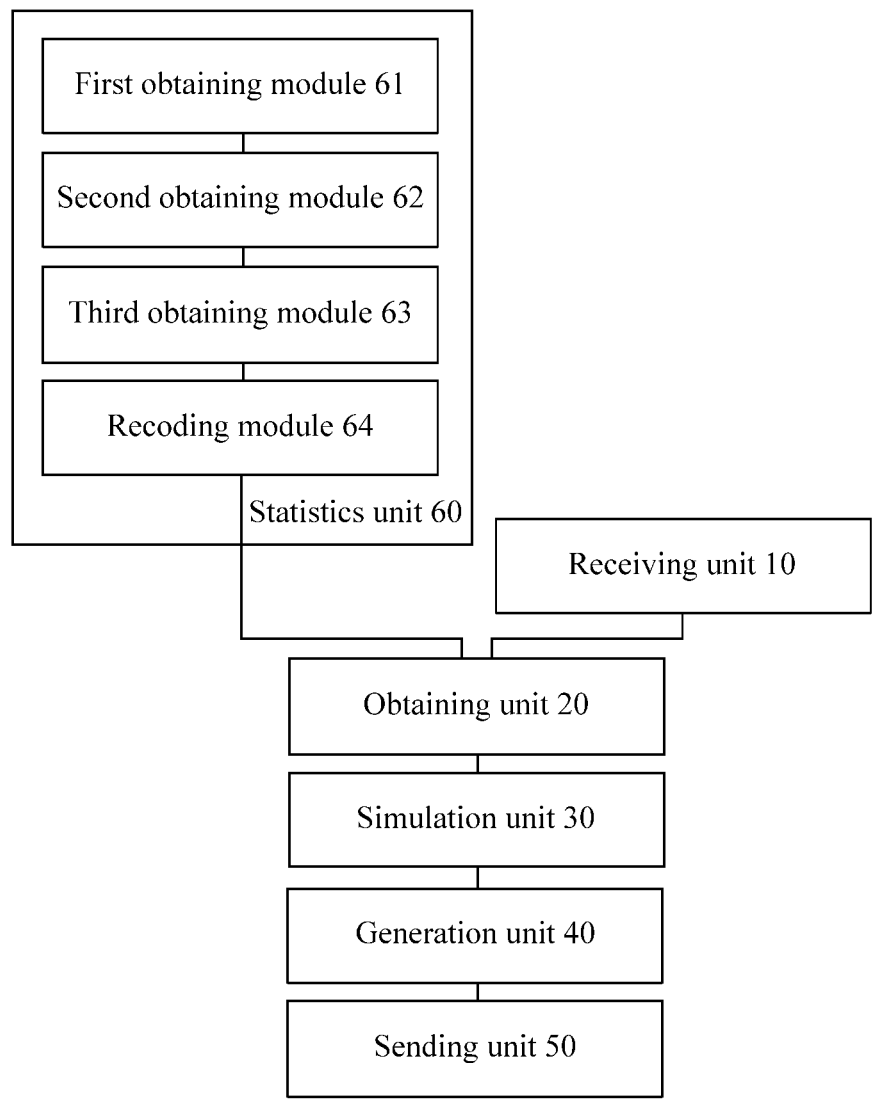
FIG. 15 is a schematic view of another device for generating character behaviors in a game according to an embodiment of the present disclosure.

FIG. 15 is a schematic view of another device for generating character behaviors in a game according to an embodiment of the present disclosure. As shown in FIG. 15, the device for generating character behaviors in a game includes a receiving unit 10, an obtaining unit 20, a simulation unit 30, a generation unit 40, a sending unit 50, and a statistics unit 60. The statistics unit 60 includes a first obtaining module 61, a second obtaining module 62, a third obtaining module 63, and a recording module 64.

It should be noted that, the receiving unit 10, the obtaining unit 20, the simulation unit 30, the generation unit 40, the sending unit 50, and the statistics unit 60 in this embodiment have the same functions as those in the device for generating character behaviors in a game in the embodiment shown in FIG. 14, and will not be described repeatedly herein.

The first obtaining module 61 is configured to obtain characters having a behavior record in each frame from each game log record, so as to obtain a complete game log sequence, where the complete game log sequence is obtained by arranging characters having a behavior record in all frames in each game log record in a time order.

The second obtaining module 62 is configured to obtain a sub-sequence of each character set from the complete game log sequence, where the plurality of characters is divided into at least two character sets, and a sub-sequence of each of the character sets is obtained by arranging characters having a behavior record and belonging to the character set in all the frames in a time order.

The third obtaining module 63 is configured to obtain a minimum full sequence of the character set from a sub-sequence of each of the character sets, where the minimum full sequence includes a continuous character string in the sub-sequence, where the continuous character string only includes an identifier of each character in the character set.

The recording module 64 is configured to record a minimum full sequence of which a quantity of times of occurrence is highest as a behavior order sequence in the behavior order library for minimum full sequences having a same character combination among minimum full sequences of all game log records of the historical game log.

It should be noted that, the first obtaining module 61, the second obtaining module 62, the third obtaining module 63, and the recording module 64 may operate in a terminal as a part of the device, and the functions implemented by the modules may be performed by a processor in the terminal. The terminal may also be a terminal device such as an intelligent phone (such as an Android phone and an iOS phone), a tablet computer, a palm computer, a Mobile Internet Device (MID), and a PAD.

Optionally, in the device for generating character behaviors in a game in the embodiments of the present disclosure, the current game includes a real-time strategic game, the plurality of characters is divided into at least two character sets, where the at least two character sets are opposite in the real-time strategic game.

It should be noted that, the receiving unit 10 in this embodiment may be configured to perform step S402 in the embodiment of this application, the obtaining unit 20 in this embodiment may be configured to perform step S404 in the embodiment of this application, the simulation unit 30 in this embodiment may be configured to perform step S406 in this embodiment of this application, the generation unit 40 in this embodiment may be configured to perform step S408 in the embodiment of this application, and the sending unit 50 in this embodiment may be configured to perform step S410 in the embodiment of this application.

This embodiment receives status data of a current game sent by a game client through a receiving unit 10, the status data being used to indicate current statuses of a plurality of characters in the current game, starts from the current status through an obtaining unit 20 and obtain a behavior order sequence related to the current game from a pre-established behavior order library, the behavior order sequence recording behavior execution orders of a plurality of characters, performs simulation on a plurality of characters by using a behavior prediction model in sequence according to a behavior execution order through a simulation unit 30, so as to obtain a simulation result and an updated behavior prediction model, the updated behavior prediction model being obtained by updating according to the simulation result, uses the updated behavior prediction model to generate behavior information through a generation unit 40, the behavior information being used to indicate a following behavior of one or more of the plurality of characters after the current status, and sends the behavior information to the game client through a sending unit 50, so as to resolve the problem that accuracy of generating character behaviors in a game is relatively low, and achieve technical effects of enhancing accuracy of generating character behaviors in a game and generation efficiency.

It should be noted that, examples and application scenes that are implemented by the units and modules and corresponding steps are the same, but are not limited to the disclosure in the embodiments. It should be noted that, the units and modules, as a part of the device, may operate in a hardware environment shown in FIG. 3, and may be implemented by software or hardware. The hardware environment includes a network environment.

Each functional module provided in the embodiments of this application may operate in a mobile terminal, a computer terminal, or a similar computation device, and may also be stored as a part of a storage medium.

Therefore, an embodiment of the present disclosure may provide a terminal, and the terminal may be any computer terminal device in a computer terminal group. Optionally, in this embodiment, the terminal may also be replaced with a terminal device such as a mobile terminal.

Optionally, in this embodiment, the terminal may be located in at least one network device among a plurality of network devices in a computer network.

According to one aspect of the embodiment of the present disclosure, a terminal for implementing the method for generating character behaviors in a game is further provided. The terminal may be a computer terminal, and the computer terminal may be any computer terminal device in a computer terminal group. Optionally, in this embodiment, the computer terminal may also be replaced with a terminal device such as a mobile terminal.

Optionally, in this embodiment, the computer terminal may be located in at least one network device among a plurality of network devices in a computer network.

Figure 16:
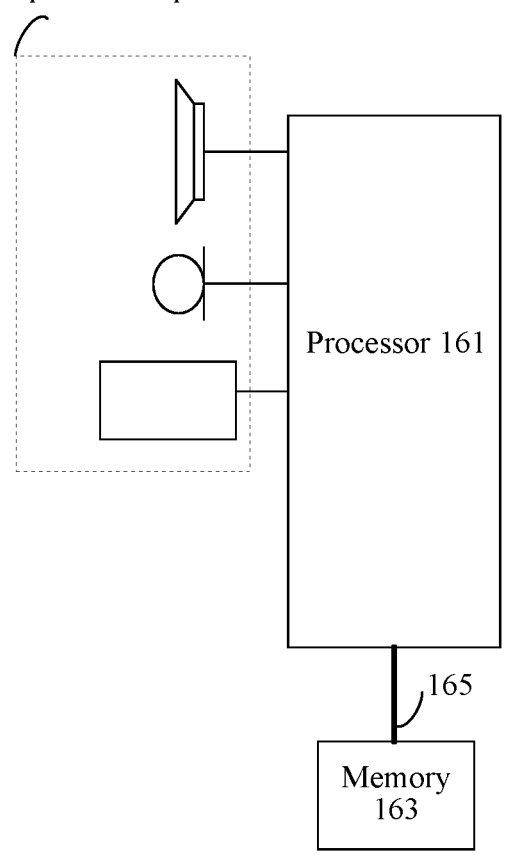
FIG. 16 is a structural block diagram of a terminal according to an embodiment of the present disclosure.

FIG. 16 is a block structural diagram of a terminal according to an embodiment of the present disclosure. As shown in FIG. 16, the terminal may include: one or more (only one shown in FIG. 16) processors 161, a memory 163, and a transmission device 165. As shown in FIG. 16, the terminal may further include an input and output device 167.

The memory 163 may be configured to store software programs and modules, for example, program instructions/modules corresponding to the method and device for generating character behaviors in a game in the embodiment of the present disclosure, and the processor 161 performs various function applications and data processing by operating software programs and modules stored in the memory 163, that is, implementing the method for generating character behaviors in a game. The memory 163 may include a high-speed random memory, and may further include a non-volatile memory, for example, one or more magnetic storage devices, flash memories, or other non-volatile solid state memories. In some examples, the memory 163 may further include a memory that is arranged remotely with respect to the processor 161, and the remote memories may be connected to a terminal via a network. The examples of the network include, but are not limited to, Internet, enterprise intranets, local area networks, mobile communications network and combinations thereof.

The transmission device 165 is configured to receive or send data via a network, and may also be configured to perform data transmission between the processor and the memory. The specific examples of the network may include wired or wireless networks. In one example, the transmission device 165 includes a Network Interface Controller (NIC) that may be connected to other network devices and routers through network cables so as to communicate with Internet and a local area network. In one example, the transmission device 165 is a Radio Frequency (RF) module that communicates with Internet in a wireless mode.

Specifically, the memory 163 is configured to store application programs.

The processor 161 may invoke an application program stored in the memory 163 through the transmission device 165, so as to execute program code of method steps in each optional or preferred embodiment in the foregoing method embodiments, including:

receiving status data of a current game sent by a game client, the status data being used to indicate current statuses of a plurality of characters in the current game;

starting from the current status, and obtaining a behavior order sequence related to the current game from a pre-established behavior order library, the behavior order sequence recording a behavior execution order of the plurality of characters;

performing simulation on the plurality of characters by using a behavior prediction model in sequence according to the behavior execution order to obtain a simulation result and an updated behavior prediction model, the updated behavior prediction model being obtained by updating according to the simulation result; and using the updated behavior prediction model to generate behavior information, the behavior information being used to indicate a following behavior of one or more of the plurality of characters after the current status; and sending the behavior information to the game client.

The processor 161 is further configured to perform following steps: the performing simulation on the plurality of characters by using a behavior prediction model in sequence according to the behavior execution order to obtain a simulation result and an updated behavior prediction model includes: obtaining a current to-be-simulated character from the plurality of characters in sequence according to the behavior execution order in the simulation, and performing steps 1 to 3 repeatedly: step 1: performing simulation on the current to-be-simulated character by using a behavior prediction model obtained by updating after last simulation; step 2: determining whether a current simulation result for indicating the current game is over is obtained after performing simulation the current to-be-simulated character; step 3: ending the simulation if obtaining the current simulation result and updating a behavior prediction model obtained by updating after the last simulation according to the current simulation result, the simulation result including the current simulation result obtained after each simulation, and the updated behavior prediction model is obtained using the current simulation result obtained by last simulation to update a behavior prediction model obtained by updating after last but one simulation.

The processor 161 is further configured to perform the following steps: taking out the current to-be-simulated character located at a head of an execution queue from the execution queue, the plurality of characters being stored in the execution queue according to the behavior execution order.

The processor 161 is further configured to perform the following steps: storing, in a condition that a current simulation result for indicating that the current game is over is not obtained, the current to-be-simulated character on which the simulation is performed into an end of the execution queue; or obtaining execution time T1 of a last behavior of the current to-be-simulated character in the current status and an interval T2 corresponding to a pre-recorded behavior frequency, and storing the current to-be-simulated character on which the simulation is performed in a position corresponding to (T1+T2) in the execution queue, the behavior frequency being corresponding to the last behavior.

The processor 161 is further configured to perform the following steps: before obtaining a behavior order sequence related to the current game from the pre-established behavior order library, performing statistical operation on a historical game log to obtain a behavior order sequence in the behavior order library, where each game log record in the historical game log is recorded at a predetermined frame rate, and each frame at the predetermined frame rate has at most one character that is performing a behavior.

The processor 161 is further configured to perform the following steps: obtaining a character of each frame having a behavior record from each game log record to obtain a complete game log sequence, the complete game log sequence being obtained by arranging characters having a behavior record in all frames in each game log record in a time order; obtaining a sub-sequence of each character set from the complete game log sequence, the plurality of characters being divided into at least two character sets, a sub-sequence of each of the character sets being obtained by arranging characters having a behavior record and belonging to the character set in all the frames in a time order; obtaining, from a sub-sequence of each of the character sets, a minimum full sequence of the character set, the minimum full sequence including a continuous character string in the sub-sequence, and the continuous character string only including an identifier of each character in the character set; recording a minimum full sequence of which a quantity of times of occurrence is highest as a behavior order sequence in the behavior order library for minimum full sequences having a same character combination among minimum full sequences of all game log records of the historical game log.

In this embodiment of the present disclosure, a solution of a method for generating character behaviors in a game is provided. Receive status data of a current game sent by a game client, the status data being used to indicate current statuses of a plurality of characters in the current game; start from the current status and obtain a behavior order sequence related to the current game from a pre-established behavior order library, the behavior order sequence recording a behavior execution order of the plurality of characters; perform simulation on the plurality of characters by using a behavior prediction model in sequence according to the behavior execution order to obtain a simulation result and an updated behavior prediction model, the updated behavior prediction model being obtained by updating according to the simulation result; use the updated behavior prediction model to generate behavior information, the behavior information being used to indicate a following behavior of one or more of the plurality of characters after the current status; and send the behavior information to the game client, so as to achieve the purpose of generating character behaviors in a game, achieve technical effects of enhancing accuracy of generating character behaviors in a game and generation efficiency, and solve the problem that accuracy of generating character behaviors in a game is relatively low.

Optionally, the specific examples in this embodiment may be referred to in the examples described in the foregoing embodiment and will not be described repeatedly herein.

A person of ordinary skill in the art should understand that, the structure shown in FIG. 16 is only schematic. The terminal may also be a terminal device such as an intelligent phone (such as an Android phone and an iOS phone), a tablet computer, a palm computer, a Mobile Internet Device (MID), and a PAD. FIG. 16 does not limit a structure of an electronic device, for example, the terminal may further include more or less components (such as network interfaces and display devices) than those in FIG. 16, or have a configuration that is different from that in FIG. 16.

A person of ordinary skill in the art could understand that all or partial steps of various methods in the embodiments may be finished by instructing relevant hardware of the terminal device through a program, the program may be stored in a computer readable storage medium, and the storage medium may include a flash memory disk, a Read-Only Memory (ROM), a Random Access Memory (RAM), a magnetic disc, or an optical disc.

An embodiment of the present disclosure further provides a storage medium.

Optionally, in this embodiment, the storage medium may store program code that is used to perform the steps of the method for generating character behaviors in a game provided by the foregoing method embodiment.

Optionally, in this embodiment, the storage medium may be located in any computer terminal in a computer terminal group in a computer network, or located in any one mobile terminal in a mobile terminal group.

Optionally, in this embodiment, the storage medium is configured to store the program code for performing following steps:

receiving status data of a current game sent by a game client, the status data being used to indicate current statuses of a plurality of characters in the current game;

starting from the current status and obtaining a behavior order sequence related to the current game from a pre-established behavior order library, the behavior order sequence recording a behavior execution order of the plurality of characters;

performing simulation on the plurality of characters by using a behavior prediction model in sequence according to the behavior execution order to obtain a simulation result and an updated behavior prediction model, the updated behavior prediction model being obtained by updating according to the simulation result; and using the updated behavior prediction model to generate behavior information, the behavior information being used to indicate a following behavior of one or more of the plurality of characters after the current status; and sending the behavior information to the game client.

Optionally, the storage medium is further configured to store program code for performing the steps: the performing simulation on the plurality of characters by using a behavior prediction model in sequence according to the behavior execution order to obtain a simulation result and an updated behavior prediction model includes: obtaining a current to-be-simulated character from the plurality of characters in sequence according to the behavior execution order in the simulation, and performing following steps 1 to 3 repeatedly: step 1: performing simulation on the current to-be-simulated character by using a behavior prediction model obtained by updating after last simulation; step 2: determining whether a current simulation result for indicating that the current game is over is obtained after performing simulation the current to-be-simulated character; step 3: ending the simulation if obtaining the current simulation result and updating a behavior prediction model obtained by updating after the last simulation according to the current simulation result; the simulation result including the current simulation result obtained by each simulation, and the updated behavior prediction model is obtained by using the current simulation result obtained by last simulation to update a behavior prediction model obtained by updating after last but one simulation.

The storage medium is further configured to store program code for performing the following steps: taking out the current to-be-simulated character located at a head of an execution queue from the execution queue, the plurality of characters being stored into the execution queue according to the behavior execution order.

The storage medium is further configured to store program code for performing the following steps: storing, in a condition that a current simulation result for indicating that the current game is over is not obtained, the current to-be-simulated character on which the simulation is performed into an end of the execution queue; or obtaining execution time T1 of a last behavior of the current to-be-simulated character in the current status and an interval T2 corresponding to a pre-recorded behavior frequency, and storing the current to-be-simulated character on which the simulation is performed in a position corresponding to (T1+T2) in the execution queue, the behavior frequency being corresponding to the last behavior.

The storage medium is further configured to store program code for performing the following steps: before the obtaining a behavior order sequence related to the current game from a pre-established behavior order library, performing statistical operation on a historical game log to obtain a behavior order sequence in the behavior order library, each game log record in the historical game log being recorded at a predetermined frame rate, and each frame at the predetermined frame rate having at most one character that is performing a behavior.

The storage medium is further configured to store program code for performing the following steps: obtaining a character of each frame having a behavior record from each game log record to obtain a complete game log sequence, the complete game log sequence being obtained by arranging characters having a behavior record in all frames in each game log record in a time order; obtaining a sub-sequence of each character set from the complete game log sequence, the plurality of characters being divided into at least two character sets, a sub-sequence of each of the character sets being obtained by arranging characters having a behavior record and belonging to the character set in all the frames in a time order; obtaining, from a sub-sequence of each of the character sets, a minimum full sequence of the character set, the minimum full sequence including a continuous character string in the sub-sequence, and the continuous character string only including an identifier of each character in the character set; recording a minimum full sequence of which a quantity of times of occurrence is highest as a behavior order sequence in the behavior order library for minimum full sequences having a same character combination among minimum full sequences of all game log records of the historical game log.

Optionally, the specific examples in this embodiment may be referred to in the examples described in the foregoing embodiment and will not be described repeatedly herein.

Optionally, in this embodiment, the storage medium may include, but is not limited to, a medium that may store program code, such as a U disc, a Read-Only Memory (ROM), a Random Access Memory (RAM), a mobile hard disc, a magnetic disc, or an optical disc.

The method and device for generating character behaviors in a game according to the present disclosure are described in an exemplary manner with reference to the accompanying drawings. However, a person skilled in the art could understand that, for the method and device for generating character behaviors in a game provided in the present disclosure, various improvements may be made without departing from the content of the present disclosure. Therefore, the protection scope of the present disclosure is determined by the content of the claims.

The numbers in the embodiments of the present disclosure are only for description, and do not represent merits and demerits of the embodiments.

If the units integrated in the foregoing embodiment are implemented in the form of software functional units and sold and used as independent products, the units may be stored in the computer readable storage medium. Based on such understanding, the technical solution in the present disclosure essentially, the part that makes contributions to the prior art, or the whole or partial technical solution may be embodied in the form of a software product, the computer software product is stored in the storage medium, and includes several instructions to enable one or more computer devices (that may be personal computers, servers, or network devices) to perform all or partial steps of the method according to each embodiment of the present disclosure.

For the foregoing embodiments of the present disclosure, the description of each embodiment has its own emphasis, and the part that is not described specifically in one embodiment may be referred to from the relevant description of other embodiments.

In the several embodiments provided in this application, it should be understood that, the client may be implemented in another manner. The device embodiment described above is only exemplary, for example, division of a unit is only division of a logical function, and the unit may be divided in another manner during actual implementation, for example, a plurality of units or components may be combined or integrated into another system, or some features may be neglected or not implemented. In addition, mutual coupling, direct coupling, or communications connection as displayed or discussed may be indirect coupling or communications connection through some interfaces, units or modules in an electrical or another form.

Units described as separate members may or may not be separated physically, members displayed as units may or may not be physical units, that is, may be located at the same place or distributed onto a plurality of network units. Partial or all units may be selected according to actual demand to implement the purpose of the solution of this embodiment.

In addition, each functional unit in each embodiment of the present disclosure may be integrated into one processing unit or each unit may exist independently and physically, or two or more units are integrated in one unit. The integrated unit may be implemented in the form of hardware or a software functional unit.

The foregoing descriptions are merely preferred embodiments and examples of the present disclosure. It should be indicated that a person of ordinary skill in the art could make improvements and modifications without departing from the principle of the present disclosure, and these improvements and modifications may be regarded to fall in the protection scope of the present disclosure.

INDUSTRIAL APPLICABILITY

One implementation of the current disclosure includes: receive status data of a current game sent by a game client, the status data being used to indicate current statuses of a plurality of characters in the current game; start from the current status and obtain a behavior order sequence related to the current game from a pre-established behavior order library, the behavior order sequence recording a behavior execution order of the plurality of characters; perform simulation on the plurality of characters by using a behavior prediction model in sequence according to the behavior execution order to obtain a simulation result and an updated behavior prediction model, the updated behavior prediction model being obtained by updating according to the simulation result; use the updated behavior prediction model to generate behavior information, the behavior information being used to indicate a following behavior of one or more of the plurality of characters after the current status; send the behavior information to the game client, so as to achieve the purpose of generating character behaviors in a game and make simulation be more reasonably, thereby enhancing accuracy of generating character behaviors in a game and generation efficiency, and resolving the problem that accuracy of generating character behaviors in a game is relatively low.

What is claimed is:

1. A method for predicting character behaviors of a non-player character in a game by a device having a processor, the method comprising:
receiving status data of a current game sent by a game client, the status data being used to indicate current status of a plurality of characters in the current game being played;
performing statistical operation on a historical game log to derive a behavior order sequence in a pre-established behavior order library, wherein each game log record in the historical game log is recorded at a predetermined frame rate, and each frame at the predetermined frame rate contains at most one character that is performing a behavior;
obtaining the behavior order sequence related to the current game from the pre-established behavior order library based on the current status, wherein the behavior order sequence indicates a behavior execution order of the plurality of characters including both player characters and non-player characters;
performing simulation on the plurality of characters by using a behavior prediction model in sequence according to the behavior execution order to obtain a simulation result;

updating the behavior prediction model according to the simulation result to obtained an updated behavior prediction model;

using the updated behavior prediction model to generate behavior information, the behavior information being used to indicate next behaviors of one or more non-player characters among the plurality of characters; and sending the behavior information to the game client to control the behavior of the one or more non-player characters.

2. The method according to claim 1, wherein performing simulation on the plurality of characters by using a behavior prediction model in sequence according to the behavior execution order to obtain a simulation result and updating the behavior prediction model according the simulation result comprises:

obtaining a current to-be-simulated character from the plurality of characters in sequence according to the behavior execution order in the simulation;

iteratively performing steps 1 to 3:

step 1: performing simulation on the current to-be-simulated character by using a behavior prediction model most recently updated after a previous simulation;

step 2: determining whether a current simulation result indicates that the current game is over after performing simulation the current to-be-simulated character; and step 3: ending the simulation if the current simulation result indicates that the game is over and updating the behavior prediction model most recently updated after the previous simulation according to the current simulation result to obtain the updated behavior prediction model.

3. The method according to claim 2, wherein obtaining the current to-be-simulated character from the plurality of characters in sequence according to the behavior execution order in the simulation comprises:

selecting the current to-be-simulated character located at head of an execution queue, wherein the plurality of characters is stored in the execution queue according to the behavior execution order.

4. The method according to claim 3, when performing simulation on the plurality of characters, further comprising:

storing, under a condition that a current simulation result indicates that the current game is not over, the current to-be-simulated character on which the simulation is performed into an end of the execution queue; or obtaining an execution time T1 of a last behavior of the current to-be-simulated character in the current status of the current to-be-simulated character and an interval T2 corresponding to a predetermined behavior frequency for the last behavior of the current to-be-simulated character, and storing the current to-be-simulated character on which the simulation is performed in a position corresponding to (T1+T2) in the execution queue.

5. The method according to claim 1, wherein performing statistical operation on the historical game log to derive the behavior order sequence in the pre-established behavior order library comprises:

obtaining a character of each frame having a behavior record from each game log record to obtain a complete game log sequence, wherein the complete game log sequence comprises characters having a behavior record extracted from all frames and arranged in a time order;

obtaining a sub-sequence of each character combination from the complete game log sequence, wherein the plurality of characters are divided into at least two character combinations, the sub-sequence of each of the character combinations is obtained by arranging characters having a behavior record and belonging to the each of the character combination in a time order;

obtaining, from the sub-sequence of each of the character combinations, one or more minimum full sequences for the each of the character combinations, wherein each minimum full sequence comprises unique continuous sequence comprising every character in the each of the character combination and extracted from the sub-sequence of each of the character combinations; and recording a minimum full sequence among the one or more minimum full sequences with a highest number of occurrence as the behavior order sequence in the pre-established behavior order library.

6. The method according to claim 1, wherein the current game comprises a real-time strategic game and the plurality of characters is divided into at least two character combinations, and wherein the at least two character combinations are of opposite side in the real-time strategic game.

7. A device for generating character behaviors in a game, comprising:

a memory for storing instructions; and a processor in communication with the memory;

wherein the processor, when executing the instructions, is configured to:

receive status data of a current game sent by a game client, the status data being used to indicate current status of a plurality of characters in the current game;

perform statistical operation on a historical game log to derive a behavior order sequence in a pre-established behavior order library, wherein each game log record in the historical game log is recorded at a predetermined frame rate, and each frame at the predetermined frame rate contains at most one character that is performing a behavior;

obtain the behavior order sequence related to the current game from the pre-established behavior order library based on the current status, wherein the behavior order sequence indicates a behavior execution order of the plurality of characters including both player characters and non-player characters;

perform simulation on the plurality of characters by using a behavior prediction model in sequence according to the behavior execution order to obtain a simulation result;

update the behavior prediction model according to the simulation result to obtained an updated behavior prediction model;

use the updated behavior prediction model to generate behavior information, the behavior information being used to indicate next behaviors of one or more of the plurality of non-player characters among the plurality of characters; and send the behavior information to the game client to control the behavior of the one or more non-player characters.

8. The device according to claim 7, wherein the processor, when executing the instructions to perform simulation on the plurality of characters by using a behavior prediction model in sequence according to the behavior execution order to obtain a simulation result, is configure to:
   obtain a current to-be-simulated character from the plurality of characters in sequence according to the behavior execution order in the simulation'
   iteratively and perform steps 1 to 3:
     step 1: perform simulation on the current to-be-simulated character by using a behavior prediction model most recently updated after a previous simulation;
     step 2: determine whether a current simulation result indicates that the current game is over after performing simulation the current to-be-simulated character; and
     step 3: end the simulation if the current simulation result indicates that the game is over and updating the behavior prediction model most recently updated after the previous simulation according to the current simulation result to obtain the updated behavior prediction model.

9. The device according to claim 8, wherein processor, when executing the instructions to perform simulation on the plurality of characters by using a behavior prediction model in sequence according to the behavior execution order to obtain a simulation result, is configured to select the current to-be-simulated character located at a head of an execution queue, wherein the plurality of characters is stored into the execution queue according to the behavior execution order.

10. The device according to claim 9, wherein processor, when executing the instructions to perform simulation on the plurality of characters by using a behavior prediction model in sequence according to the behavior execution order to obtain a simulation result, is further configure to:
   under a situation that a current simulation result indicates that the current game is not over, store the current to-be-simulated character on which the simulation is performed into an end of the execution queue;
   or obtain an execution time T1 of a last behavior of the current to-be-simulated character in the current status of the current to-be-simulated character and an interval T2 corresponding to a predetermined behavior frequency for the last behavior of the current to-be-simulated character, and store the current to-be-simulated character on which the simulation is performed in a position corresponding to (T1+T2) in the execution queue.

11. The device according to claim 7, wherein the processor, when executing the instructions to perform the statistical operation, is further configured to:
   obtain characters having a behavior record in each frame from each game log record, so as to obtain a complete game log sequence, wherein the complete game log sequence comprises characters having a behavior record extracted from all frames and arranged in a time order;
   obtain a sub-sequence of each character combination from the complete game log sequence, wherein the plurality of characters are divided into at least two character combinations, and the sub-sequence of each of the character combinations is obtained by arranging characters having a behavior record and belonging to the each of the character combination in a time order;
   obtain, from the sub-sequence of each of the character combinations, one or more minimum full sequences for the each of the character combination, wherein each minimum full sequence comprises unique continuous sequence comprising every character in the each of the character combination and extracted from the sub-sequence of each of the character combinations; and
   record a minimum full sequence among the one or more minimum full sequences with a highest number of occurrence t as the behavior order sequence in the pre-established behavior order library.

12. The device according to claim 7, wherein the current game comprises a real-time strategic game and the plurality of characters is divided into at least two character combinations, and wherein the at least two character combinations are of opposite side in the real-time strategic game.

13. A non-transient computer readable storage medium for storing program code, the program code, when executed by a process, cause processor to:
   receive status data of a current game sent by a game client, the status data being used to indicate current status of a plurality of characters in the current game;
   perform statistical operation on a historical game log to derive a behavior order sequence in a pre-established behavior order library, wherein each game log record in the historical game log is recorded at a predetermined frame rate, and each frame at the predetermined frame rate contains at most one character that is performing a behavior, and
   obtain the behavior order sequence related to the current game from the pre-established behavior order library based on the current status, wherein the behavior order sequence indicates a behavior execution order of the plurality of characters including both player characters and non-player characters;
   perform simulation on the plurality of characters by using a behavior prediction model in sequence according to the behavior execution order to obtain a simulation result;
   update the behavior prediction model according to the simulation result to obtained an updated behavior prediction model;
   use the updated behavior prediction model to generate behavior information, the behavior information being used to indicate next behaviors of one or more of the plurality of non-player characters among the plurality of characters; and
   send the behavior information to the game client to control the behavior of the one or more non-player characters.

* * * * *